Nov. 22, 1966   J. T. ZELLERS, JR   3,286,893
METHOD AND APPARATUS FOR AUTOMATIC GLASS CUTTING
Filed Sept. 1, 1965   8 Sheets-Sheet 1

INVENTOR.
James T. Zellers, Jr.
BY
Nobbe & Swope
ATTORNEYS

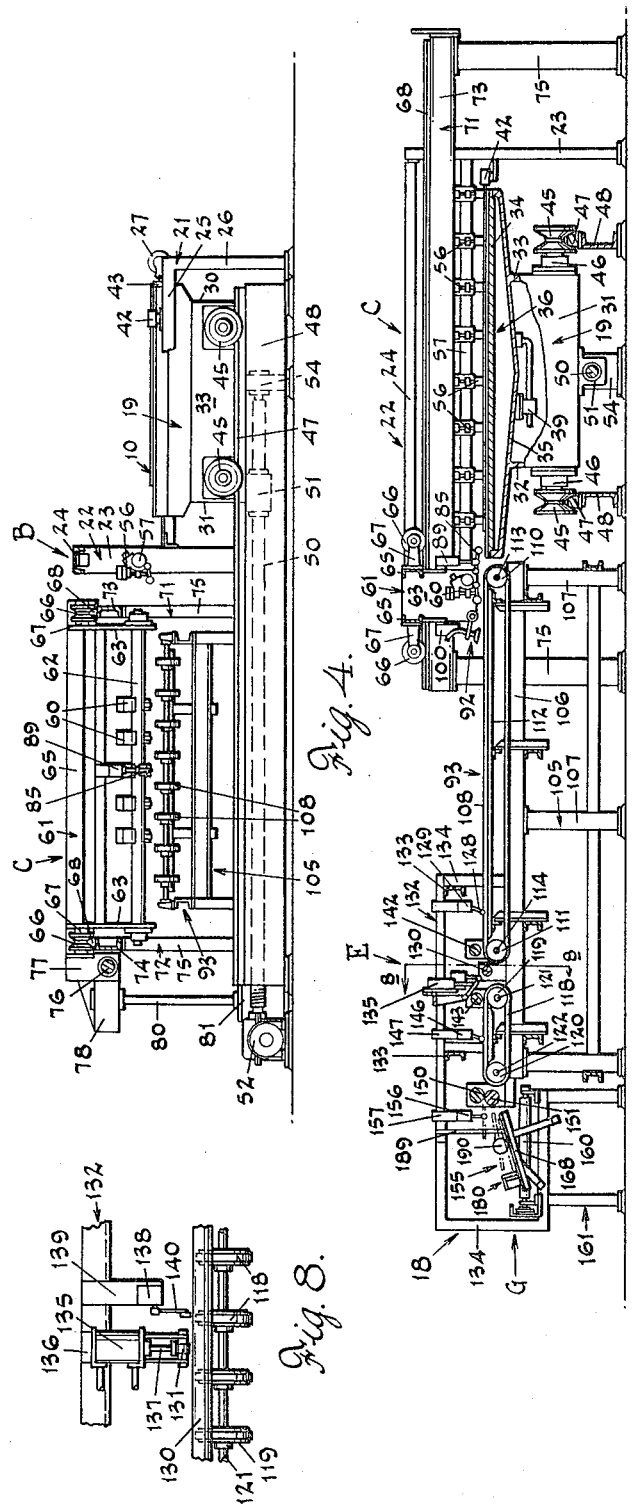

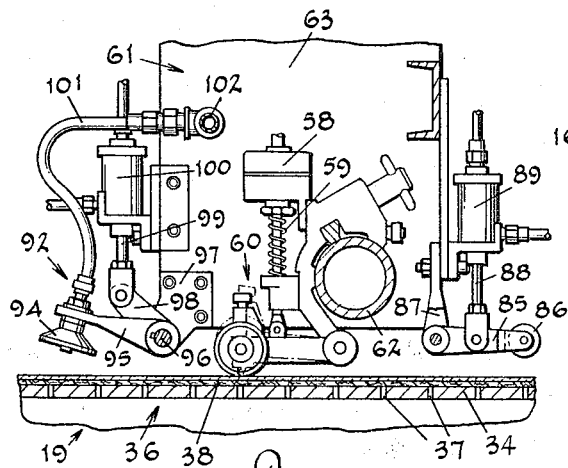

Nov. 22, 1966  J. T. ZELLERS, JR  3,286,893
METHOD AND APPARATUS FOR AUTOMATIC GLASS CUTTING
Filed Sept. 1, 1965  8 Sheets-Sheet 4

INVENTOR.
James T. Zellers, Jr.
BY
Nobbe & Swope
ATTORNEYS

INVENTOR.
James T. Zellers, Jr.
BY Nobbe & Swope
ATTORNEYS

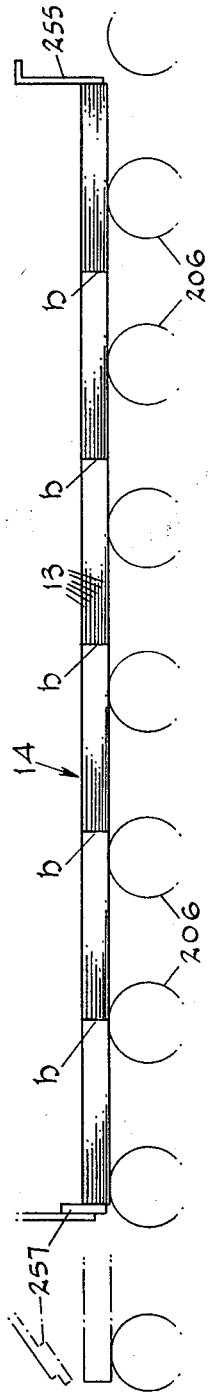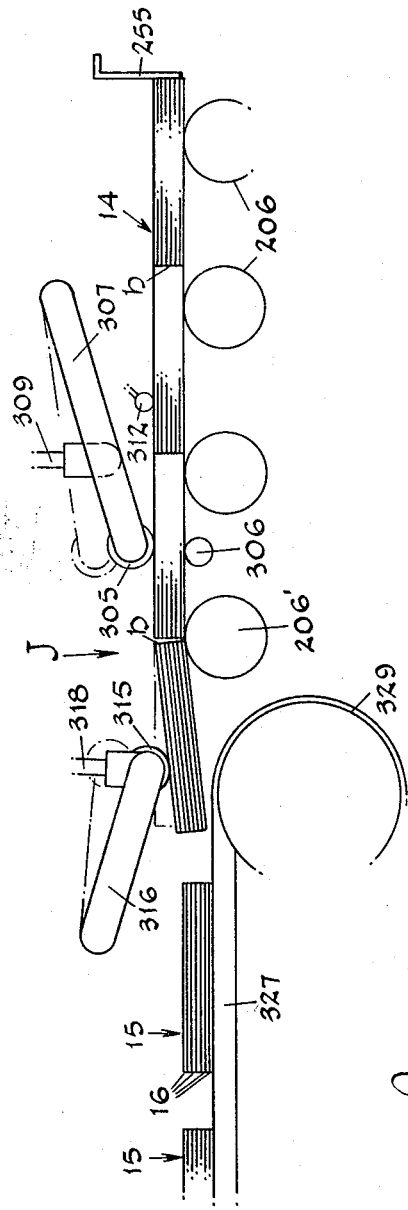

INVENTOR.
James T. Zellers, Jr.
BY
Nobbe & Swope
ATTORNEYS

United States Patent Office 3,286,893
Patented Nov. 22, 1966

3,286,893
METHOD AND APPARATUS FOR AUTOMATIC GLASS CUTTING
James T. Zellers, Jr., Charleston, W. Va., assignor to Libbey-Owens-Ford Glass Company, Toledo, Ohio, a corporation of Ohio
Filed Sept. 1, 1965, Ser. No. 484,307
42 Claims. (Cl. 225—2)

The present invention relates broadly to the cutting of glass and more particularly to an improved method and apparatus for cutting sheets or plates of glass.

A primary object of this invention is to provide an improved method and apparatus for cutting large sheets of glass in a rapid, automatic manner to predetermined finished sizes accurately and uniformly.

Another object of the invention is to provide a novel method and apparatus for separating glass sheets into a plurality of smaller units by stacking a plurality of scored sheets upon one another and breaking the sheets in the stack simultaneously along superimposed score lines.

Another object is to provide a method and apparatus whereby a plurality of scored sheets moving along a predetermined path are successively caused to fall freely one up the other to form a stack and with the score lines in registry with one another preparatory to being broken along groups of score lines.

A further object is to provide a method and apparatus for automatically stacking scored glass sheets or strips in such a way that surface scratching caused by glass-to-glass contact is substantially eliminated.

Still another object is to provide a method and apparatus of the above character wherein relatively large sheets or plates of glass are scored along a plurality of lines arranged both transversely and longitudinally of said sheet, the sheet broken into a plurality of strips along the transverse score lines and arranged in a stack, with the longitudinal score lines in superimposed relation, the stack of strips then being automatically separated along the longitudinal score lines, the entire operation being automatically carried out in a programmed sequence of operations.

Other objects and advantages of the invention will become more apparent during the course of the following description when read in connection with the accompanying drawings.

In the drawings, wherein like numerals are employed to designate like parts throughout the same:

FIG. 4 is an end elevation of the apparatus;

FIG. 5 is an elevation of the opposite end of the apparatus;

FIG. 6 is a longitudinal, vertical section of the apparatus taken on line 6—6 of FIG. 2;

FIG. 10 is a longitudinal, vertical section taken on line 7—7 of FIG. 2;

FIG. 8 is a transverse, vertical section taken on line 8—8 of FIG. 6;

FIG. 9 is a plan view of the stacking table of the apparatus;

FIG. 10 is a fragmentary transverse, vertical section taken on line 10—10 of FIG. 9;

FIG. 13 is a transverse, vertical section taken on line 13—13 of FIG. 11;

FIG. 14 is a similar transverse, vertical section taken on line 14—14 of FIG. 11;

FIGS. 15 through 21 are diagrammatic views of the progressive steps in the breaking of a sheet into a group of strips along one plurality of score lines, piling the group of strips in stacked relation and breaking of the stack of strips into individual stacks of small panes along a second plurality of score lines;

Generally stated, this invention relates to the cutting or scoring of a sheet or plate of glass along a plurality of lines parallel to one edge thereof and along a plurality of intersecting lines parallel to a second edge of the sheet. According to known earlier practices, glass scoring or cutting apparatus, such as is disclosed in Patent 2,048,576, issued to Drake et al., June 22, 1937, were adapted to successively score a glass sheet into a plurality of smaller rectangular panes by forming parallel transverse and longitudinal score lines therein. It was then necessary to break the sheet along one plurality of score lines and then along the second plurality of score lines to obtain the desired number of smaller-sized rectangular panes.

As herein contemplated, the breaking of the scored glass sheet along one plurality of score lines is carried out automatically whereby a plurality of glass strips are produced. The plurality of glass strips are stacked with the remaining score lines therein arranged in vertical superimposed relation with one another. The stacked strips of glass are then successively broken along the remaining score lines to simultaneously obtain a stack of smaller-sized panes. This materially reduces the time required for manually handling, breaking and arranging of the individual panes in stacked relation.

Figure 1:
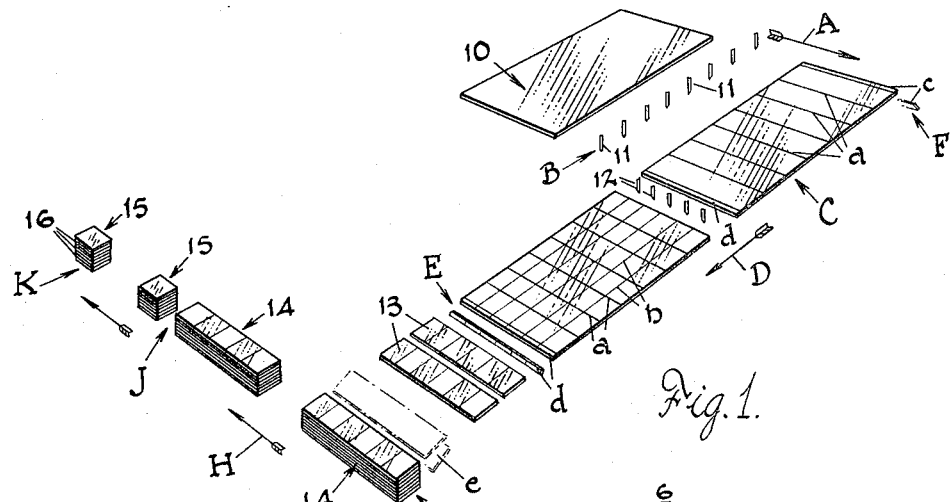
FIG. 1 is a schematic view of a sheet of glass as it is progressively cut and divided into a plurality of smaller sized panes according to the method of this invention.

Referring now more particularly to FIG. 1 of the drawings, in the illustrated embodiment a sheet or plate of glass 10 is shown as supported on a substantially horizontal supporting surface and moved forwardly thereupon in the direction of the arrow, designated by the letter A, beneath a plurality of suitably spaced scoring devices 11 in a first scoring area B whereby a plurality of cut or score lines $a$ are formed in directions parallel to its movement. While the support surface remains stationary in the second scoring area C, the sheet or blank 10 is scored by movement of similar scoring devices 12 which in this instance are moved over the sheet surface. The plurality of lines $b$ are spaced apart according to the second predetermined dimension for the small panes and are located at right angles to lines $a$ to thereby divide the relatively large sheet of glass into a plurality of smaller rectangular areas. The sheet 10 is subsequently moved longitudinally from the horizontal support surface along a first predetermined path, in the direction of the arrow designated at D, and is broken along score lines $a$ into a plurality of strips 13.

As described in connection with FIG. 1, the lines $a$ adjacent opposite ends of the sheet are spaced inwardly from the adjacent edges of the sheet 10 to form marginal end or selvage areas $c$ and $d$ that will vary in width according to a desired dimensional spacing between the lines $a$ and the total number of such dimensionally sized strips 13 relative to one overall dimension of the glass sheet 10. As indicated by the letter F, the marginal end $c$ is broken from the trailing end of the sheet along the adjoining score line $a$ in the second scoring area C. While the sheet 10 is being carried forward by a conveyor support means toward the breaking area E, the leading selvage end portion $d$ is removed from the sheet along the first or adjacent score line *a*. During continued movement of the sheet through the breaking area E, a plurality of strips 13 are successively formed by breaking of the sheet along the score lines *a*.

According to the invention, these strips, as indicated in broken lines *e*, are caused to fall freely from the conveyor support means and are successively received in stacked relation 14 on an angularly inclined support surface as at G. As each strip falls freely toward the preceding strip in the stack, it is shifted endwise to ensure that each of the several score lines *b* in each strip will be located in substantially vertical, superimposed relation with respect to like score lines *b* in other strips in the stack.

Upon completion of stacking of the individual strips 13, resulting from scoring and breaking of the large sheet 10 along lines *a*, the stack 14 is lowered, as at G, onto a horizontally disposed, further conveyor support means and is caused to move endwise along a second predetermined path, in the direction of the arrow, designated by the letter H, toward a second breaking area J. Novel means is provided by which the strips 13 are initially piled in stacked relation 14 and are individually shifted laterally to ensure that the score lines *b* of the several strips will be vertically superimposed one above the other. Also, the opposite ends of the stack are again engaged to urge them into vertical planes by means which also starts the movement of the stack toward the area J. Thus, the breaking action along lines *b* in area J can be effected simultaneously downwardly through each of the several superimposed lines *b* to successively produce individual stacks 15 of smaller rectangular panes 16. Consequently, a highly efficient method and manner of operation for cutting glass sheets is realized to the end that the stacks 15 of small panes, as at K, can be rapidly removed for packaging or storage purposes with less manual handling being required.

Figure 2:
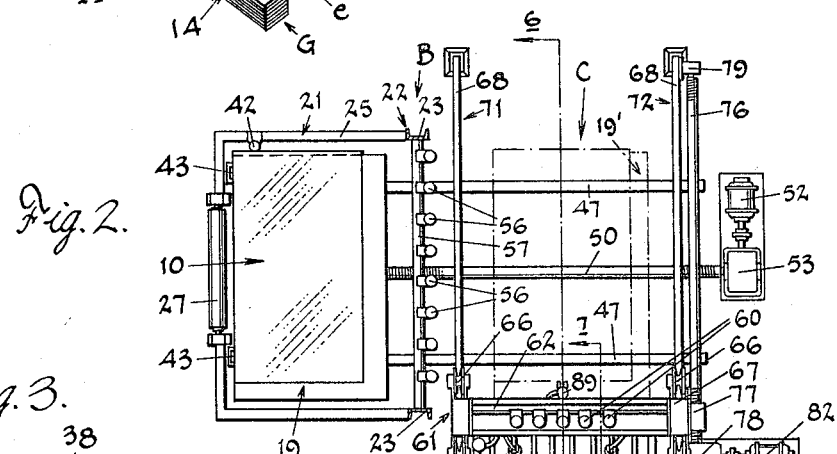
FIG. 2 is a plan view of apparatus by which the method can be practiced.

The glass stacking and breaking apparatus is generally indicated at 18 in FIG. 2 where it is shown in an illustrated embodiment of the invention and associated with other apparatus for scoring a glass blank along two sets of score lines and breaking the blanks into strips along the first set of score lines. The associated apparatus combined with the novel glass stacking and breaking apparatus includes, at the entry or loading area thereof, a horizontal supporting surface or table 19. This table 19 is adapted to support relatively large sheets or plates of glass 10 and to carry the same beneath the scoring devices 11 in a first scoring area, previously designated at B, until the table reaches a predetermined limit of movement indicated in broken lines 19' within the aforementioned second scoring area C.

The table 19 is located in the loading position within the guard rail 21 of a framework, generally designated by the numeral 22, including a pair of vertically disposed channels 23 connected at their upper ends by a bracing member 24. The guard rail 21 is formed by a substantially rectangularly-shaped angle member 25 supported by pedestals 26. To relieve the weight of a glass sheet as an operator loads the same onto the surface of table 21, the member 25 supports a rubber-covered roll 27. Thus, as one edge of a sheet is placed on the table, the sheet can be bodily lowered onto the roll 27 with the result that the operator can then conveniently push or slide the sheet without simultaneously being concerned with the weight of the relatively fragile article.

Figure 3:
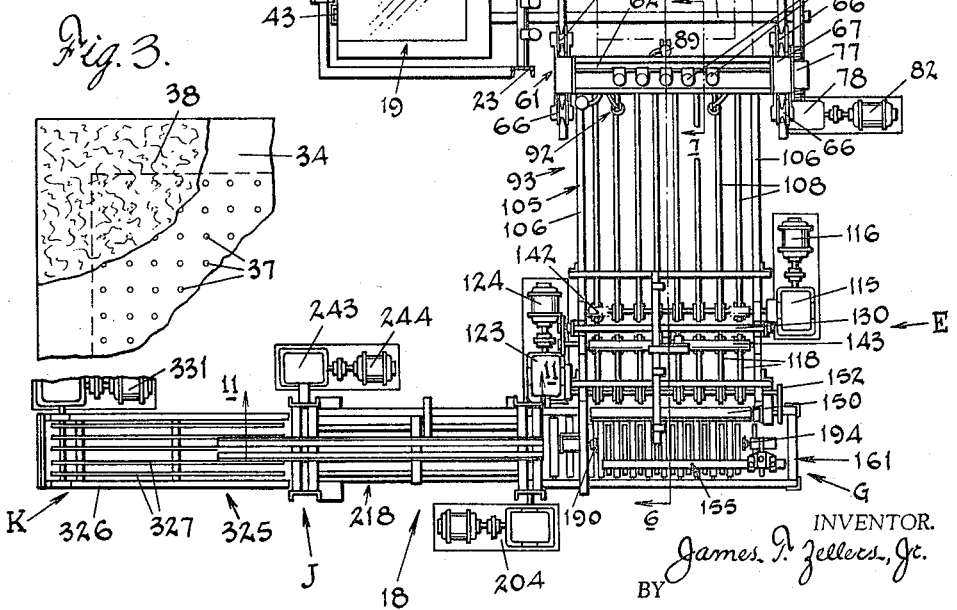
FIG. 3 is a fragmentary detail view.

Positioning of the sheet on the table surface is also facilitated by the provision of low-pressure air to create a cushion in the well-known manner against the under surface of the sheet and support the same as it is suitably located. For this purpose and as viewed in FIGS. 4 and 6, the table 21 includes end walls 30, 31, side walls 32, 33 and a top wall 34 with a partitioning wall 35 spaced from the top wall 34 to form a plenum chamber 36. As shown in FIG. 3, top wall 34 is perforated by a plurality of holes 37, communicating with the chamber 36, and is covered with a layer of suitable nonabrasive material 38, such as felt. By means of a controlled valve 39, connecting to the plenum chamber, air at relatively low pressure is directed through the holes 37 and felt layer 38 to form the cushion of air for supporting the sheet during its location. Upon reversal of valve 39, the pressure of the air cushion is reduced and a vacuum is created to hold the sheet or blank on the table and thereby firmly position the same during the first and second scoring operations.

According to one manner of locating a glass sheet, the operator slides it laterally until one end edge is engaged by a roll 42, of rubber or like nonabrasive material, that is supported by a vertical post on one side of the angle member 25. The rear edge of the sheet, as it is located, is then brought into registry with locator bars 43 carried by end wall 30 of the table. The sheet is thereby accurately positioned for both scoring operations and with the one end edge being substantially unsupported or overhanging the edge of the top wall 34 above the side wall 33 of the table, for reasons to be hereinafter explained.

The table 19 is supported for movement along a substantially horizontal rectilinear path from a first position shown by the solid lines 19 to a second position designated by the broken lines 19' of FIG. 2 by means of pairs of grooved wheels 45 supported on the respective side walls 32–33 by bearing brackets 46. The wheels 45 are adapted to traverse tracks or rails 47 that are mounted in channel members 48. Although the table may be moved in any well known manner, in the illustrated embodiment, such movement is imparted by means of a screw shaft 50 arranged between the rails and operatively passing through a drive box 51 secured to the end wall 31. The shaft 50 is driven from a motor 52 and reversible power transmission, generally designated by the numeral 53, with its opposite end being journaled in a bearing pedestal 54. As will be more fully hereinafter described, operation of the transmission 53 is determined by the position of suitable electrical switch devices.

As shown in FIGS. 2 and 6 of the illustrated embodiment, the aforementioned scoring devices 11 in the area B include a plurality of cutter units 56 mounted for lateral adjustment on a bar 57 which is supported at its respective ends on channels 23 of the framework 22. Although forming no novel part of the instant invention, the cutter units 56 are conventionally mounted on the bar 57 so as to be adjusted therealong to permit rapid and convenient changes in the spacing between the several units according to one predetermined length or dimension of the small panes of glass to be produced. Such spacing is, of course, established with regard to the pertinent dimension of the large glass sheet and the number of parallel score lines to be made therein. In this respect, it will be appreciated that the manner of mounting the cutter units 56 permits the scoring of glass sheets within a wide range of fractionally dimensioned sizes.

After halting of the table 19 at the above-indicated position in the area C, the scoring devices 12, or plurality of the cutter units 60 (FIG. 2) carried by a bridge frame 61, are caused to move longitudinally in a rectilinear path across the sheet to produce the parallel cut lines *b* in the sheet; each line *b* being at right angles to the parallel lines *a* previously formed by the cutter units or devices 56 in area B. The cutter units 60 are mounted on a bar 62 and are adapted to be adjustably moved thereon in the same manner as the aforementioned cutter units 56 to determine the second dimension or width of the small panes.

In this connection, it is realized that movement of the actual cutter devices or wheels from a lower, active position as in FIG. 7, to a raised inactive position (shown in broken line) should be made during return of the table 19 or the bridge frame 61 to their respective starting positions. Generally stated, the application of air pressure to cylinder 58 will place the cutters in position for scoring a sheet while the spring 59 will raise the cutters upon completion of the scoring operation. This manner of cutter control is fully disclosed in the patent of Walters et al., No. 2,948,991, issued August 16, 1960.

Generally speaking, the bar 62 is mounted at its ends on end plates 63 of the bridge frame. As shown in FIG. 6, the bridge frame 61 is formed by transversely disposed channel members 65 which at their ends are fixed to the end plates 63. At its opposite ends, the frame is equipped with pairs of grooved wheels 66 that are supported by means of bearing brackets 67; said wheels being adapted to traverse the tracks or rails 68 of frame structures 71 and 72. These frame structures are arranged in spaced, parallel relation at substantially right angles to the rails 47 and comprise horizontally disposed channel members 73 and 74, respectively, similarly supported at their ends by vertically disposed pedestals 75; the rails 68 being secured to the upper flanges of the channel members.

The bridge frame 61 is adapted to traverse the rails 68 in a rightward direction as viewed in FIG. 6, during the active scoring operation of the cutter units 60, by means of a power-driven screw shaft 76 (FIG. 2) operatively associated with a drive box 77 on the bridge frame and journaled at its ends in bearings brackets 78 and 79. In the case of the bearing bracket 78, the same may contain the upper gear components of a source of power including a vertically disposed shaft 80 (FIG. 4) coupled at its lower end to a transmission 81 operatively connected to a motor 82. As in the case of the table 19, the bridge frame 61, at the limit of its forward, "rightward" movement, as viewed in FIG. 6, is adapted to engage a switch device to disengage the transmission 81 to halt the frame. Likewise, at a predetermined limit of rearward movement to the rest position, the bridge frame will engage a second switch device.

Figure 15:
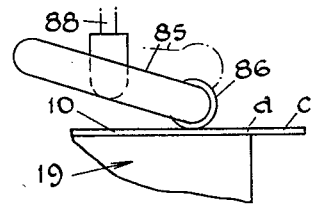
Figure 16:
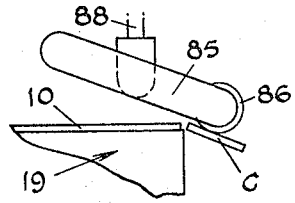

In the illustrated embodiment, as the cutter units 60 approach the end of the glass sheet overhanging the table 19, the unsupported marginal portion or selvage edge C of the sheet is removed along the adjacent score line a which is then located in very close proximity to the edge of the table. The removing or breaking action is carried out by means of a striker bar 85 equipped with a roller 86 and pivotally supported by bracket 87 on the bridge frame 61, as is shown in FIGS. 6 and 7. The bar 85 is connected to the piston rod 88 of a cylinder 89, also mounted on the bridge frame. As will hereinafter be described, the direction of pressure to cylinder 89 is controlled by suitably positioned switch devices which are adapted to cause lowering of the roller into rolling contact with the sheet surface and in inwardly spaced relation to selvage edge c to remove the same from the sheet as the cutter units 60 approach completion of their scoring action. This manner of removing this selvage edge c is shown in FIG. 15 wherein the roller 86 has been lowered into rolling contact with the surface of the sheet 10 and inwardly of the unsupported this selvage edge c is shown in FIG. 15 wherein the selvage edge c. In FIG. 16, the selvage edge c is removed along the adjacent score line a as the roller 86 passes over the unsupported portion of the sheet 10.

After passing entirely across the sheet on the table 19, the frame 61 is brought momentarily to a halt and the striker bar 85 is raised to a position shown by broken line in FIG. 15. At approximately the same time the valve 39 is reversed, releasing the vacuous condition at the undersurface of the sheet and again directing air under low pressure through the plenum chamber 36 and the openings 37 of the top wall 34 against the undersurface to the sheet to release the same from the surface of the table.

When return movement of the bridge frame 61 is initiated, sheet pushing devices 92 carried by the bridge frame are adapted to engage the glass sheet and to remove the same from the surface of the table 19 along a first predetermined path onto a first conveyor apparatus, generally designated by the numeral 93. Since the sheet at this time is more or less freely or floatingly supported on the table by the cushion of low pressure air, it is removed bodily from the surface of the table with very little effort or friction.

As herein provided, the pushing devices 92 include two or more vacuum cups 94 (FIG. 7) arranged in transversely spaced relation between the end plates 63 of the bridge frame. Each cup 94 is carried by an arm 95 that is fixed on a shaft 96 rockably supported at its ends in bearing members 97 secured to the end plates. Shaft 96 is equipped adjacent one end with an actuator lever 98 that is connected to the piston rod 99 of a cylinder 100, also supported on an end plate 63. The cups 94 are connected by flexible tubing 101 to a transversely disposed supply pipe 102 which through a suitable valve is adapted to alternatively communicate with a source of vacuum or air pressure.

As herein employed, and by means of control devices to be hereinafter described, the cup arms 95 are swung downwardly by action of the cylinder 100 and the cups 94 are connected to a source of vacuum as the bridge frame starts its return motion. The cups, upon vacuous engagement with the sheet, are thus concurrently caused to slide the sheet across and remove the same from the surface of the table 19 onto the support conveyor apparatus 93 to continue movement of the sheet along the first path.

The conveyor apparatus or means 93 (FIGS. 2 and 6) is generally supported on a framework 105 including spaced, parallel horizontal channel members 106 carried by pedestals 107. As herein disclosed, the support conveyor includes a plurality of parallel endless belts 108 with the upper and lower flights thereof being trained at their ends about grooved wheels 110 and 111 and supported therebetween by platform bars 112 to provide a substantially horizontal upper conveying surface. The wheels 110 and 111 are fixed on shafts 113 and 114, respectively, which are suitably journaled in bearings on the channel members 106. The shaft 114 is connected to a source of power, such as the transmission 115 and motor 116.

The forward movement of the sheet is continued along the first path by a continuing support or "run-out" conveyor, which is part of the conveyor means 93 and includes a plurality of belts 118 trained about grooved wheels 119 and 120 fixed on shafts 121 and 122, respectively, that are rotatably mounted on the framework 105. Shaft 122 is suitably driven from a transmission 123 and motor 124.

During movement of a glass sheet along the conveyor means 93, the leading selvage end portion, previously indicated by the letter d, is removed from the sheet as the said end passes through the aforementioned breaking area E, which is located between the aligned conveyor belts 108 and 118. Ordinarily the conveyor belts 108 are operated at a sufficiently high rate of speed to rapidly remove a sheet onto said conveyor apparatus after the vacuum cups 94 have been disengaged; this action, of course, being accomplished by release of the vacuum and rocking of shaft 96 to raise the cups upon operation of cylinder 100 to retract the associated piston rod 99. However, as the leading end of the sheet approaches the vicinity of the grooved wheels 111, it engages the roll-equipped lever arm 128 of a switch device 129 which is instrumental in reducing the speed at which the conveyor belts 108 are driven. This permits the sheet to enter the breaking area E at a suitably slow rate of speed for desired breaking along the score lines a.

The conveyor belts 108 and the belts 118 are spaced apart, as viewed in FIG. 6, to provide the open or breaking area E within which the leading selvage end d of the glass sheet will be removed by being broken from the sheet along the first score line *a* as it passes over a breaker roll 130. For this purpose, a lever arm 131, as also seen in FIG. 8, is carrier above and in spaced relation to the breaker roll 130 by means of a superstructure 132 including transversely disposed horizontal channel members 133 and pedestals 134 fixed to channels 106. As herein disclosed, the lever arm 131, equipped with a rubber roll, is adapted to operate with an upward and downward swinging motion by means of an actuator cylinder 135 supported by bracket 136 and having a piston rod 137 connected at its outer end to the arm 131. A switch device 138 is mounted on bracket 139 and has a roll-equipped lever arm 140 adapted to be engaged by the leading edge of the advancing sheet substantially simultaneous with its contact by the roll of arm 131. Removal of the selvage edge *d* at the leading end of the sheet is further shown in FIG. 17.

In response to actuation of switch device 138, the piston rod 137 of cylinder 135 is retracted to raise the arm 131 after removal of the aforementioned marginal end portion *d* from the sheet along the first score line *a*. Since the roll of lever arm 140 will be then supported on the surface of the sheet during its continued forward movement, the arm 131 will be supported in an upper position until arm 140 drops from the trailing end of the sheet. The upper position to which the arm 131 is raised is shown by broken line in FIG. 17.

Although removal of the selvage portion *c* has been described as being carried out as the bridge frame 61 approaches the end of its movement across the table 19, it is also contemplated, and within the spirit of the invention, that the end portion *c* can be as satisfactorily removed in the breaking area E and as the last, or remaining, strip portion 13 passes over the breaker roll 130. In consequence, it is believed possible to locate a breaker device, with an arm similar to the arm 131, on the "entry" side of the breaker roll and having a switch device adapted to normally hold the arm in a raised position until the selvage portion *c* approaches the breaker roll 130.

A first breaking means is located in the breaking area E and includes the breaker roll 130 and first and second hold-down rolls 142 and 143. During the breaking operation, the glass sheet is more or less firmly held against the conveyor belts 108 on the wheels 111 by the first support or hold-down roll 142. As the leading end of the sheet advances over the breaker roll 130 and toward the conveyor belts 118, it is received beneath the second support or hold-down roll 143 above grooved wheels 119 carrying conveyor belts 118. To deflect the leading end of the sheet and thereby produce successive breakage along the score lines *a*, the lower surface of the hold-down roll 143 is slightly below the upper surface of the breaker roll 130. Consequently, as the transverse score lines *a* successively enter the area between the roll 130 and wheels 119, the sheet will be broken into a plurality of strips 13 which are advanced along the first path by the conveyor belts 118 and engage the arm 145 of a switch device 146; said switch device being mounted on the structure 132 by a bracket 147. Breaking of a sheet 10 into a group of strips 13 is believed apparent in considering FIG. 18 in connection with FIG. 17.

According to prior procedures, these individual strips were passed through a second breaking area to break each strip along the second score lines *b*, producing a plurality of individual panes. Now it will be appreciated that such an operation required each individual pane to be manually removed from a conveyor which is a time-consuming and laborious procedure. Furthermore, the resulting panes had to be stacked in superimposed relation for shipment or storage.

This invention substantially eliminates surface scratching of the individual panes and considerably reduces the amount of manual labor required in breaking the strips into a plurality of smaller units. According to the invention, the individual strips 13 of each sheet are automatically stacked one upon the other with the second score lines *b* in superimposed relation and the stack is broken along each of the groups of superimposed score lines.

Figure 18:
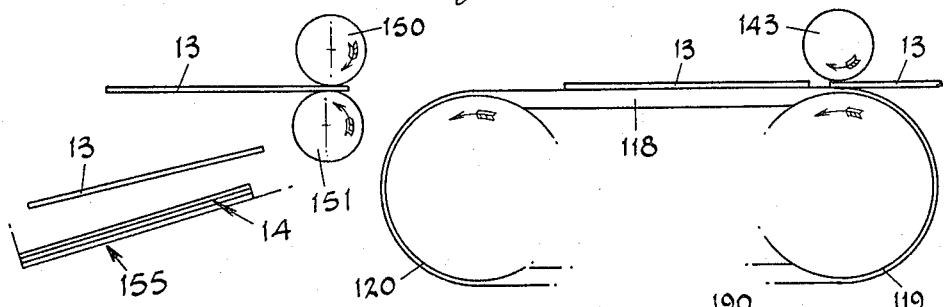

To this end, as the strips move past the ends of belts 118 of the conveyor means 93, they are passed between gripping means which continue forward movement of the strips along the first path to support each strip substantially horizontally until it is ejected from the gripping means and caused to fall freely upon a supporting surface or table 155. The gripping means include pinch rolls 150 and 151 which are suitably journaled at their ends in bearings carried by the channel members 106 and conventionally driven, as from the shaft 122 by chain belt 152. The upper roll 150 is located above the first path and spaced slightly rearwardly of the roll 151, which is located below the first path, with the annular surfaces of the rolls coacting to support the glass strips 13 in a substantially horizontal plane until they reach a position above the table 155. The strips then are ejected from between the roll surfaces and fall freely onto the pivotally mounted support or stacking table 155, as can be seen in FIG. 18. As each strip 13 emerges from between the rolls 150 and 151, its leading end engages the arm 156 of a switch device 157, also supported on the superstructure 132, which controls an aligning or shifting unit which will be described in more detail hereinafter.

The switch device 146, briefly referred to above, is employed to sequentially produce raising of the stacking table 155 from a substantially horizontal plane to an inclined position, shown in FIG. 10, to receive the strips 13 in stacked relation and then cause lowering of the table to the horizontal position to deposit the stack on a second conveyor means for movement along a second path. To this end, the switch device controls, first a switch adapted to interrupt functioning of a timing device 622 (FIG. 23) that serves to monitor intervals of time after which the stacking table is lowered and, second, a switch adapted during interruption of the action of the timing device, to raise the table to the inclined position. Normally the table is disposed in the horizontal plane while at rest and is swung upwardly when the first strip of each scored sheet engages the switch device 146.

The support table 155 is thus pivotally mounted for alternately occurring movements from a substantially horizontal plane slightly below a plane across the upper surfaces of the rolls 160 of a conveyor apparatus 161 to an angular position above the conveyor rolls. These alternate upward and downward motions of the table are determined by the switch device 146, as above-mentioned, which is responsive to the forward movement of the strips along the first path. Thus, the table is adapted to receive a plurality of strips 13 in stacked relation while angularly positioned, as in FIGS. 6 and 10; to lower the stack 14 onto the conveyor rolls 160, and to then be swung upwardly into position to receive the strips from a successively scored sheet. Piling of the strips 13 into a stack 14 and lowering of the same onto the conveyor rolls 160 is shown diagramatically in FIG. 19.

As seen in FIGS. 5, 9 and 10, the support means or table 155 closely resembles a "comb" having spaced fingers carried by a base or frame member. Actually, the table is formed by parallel base or frame bars 162 and 163, interjoined by braces 164, with the bar 162 being equipped with end axles 165 journaled in bearings 166 mounted on the framework 167 of the conveyor apparatus 161. Each so-called "finger" includes a tubular element 168 of substantially square cross-section which is supported on the bars 162 and 163 by means of struts 169 and 170. The tubular elements are arranged in parallel spaced relation such that they will move freely between the conveyor rolls 160 during pivotal movements of the table. The upper surface of each finger or element 168 is covered by a layer of felt 171 to reduce impact of at least the first strip of glass as it is received on the table.

To reduce the force of impact of the first strip of glass on the table surface, the invention contemplates providing a cushion of gas, such as low pressure air, adjacent the table surface. For this purpose, the upper wall 172 of each element 168 is provided with a plurality of small holes 173 (FIG. 9) while the lower wall 174 (FIG. 10) has a single port 175. To conveniently direct air through the ports 175, one base bar, such as 162, and the associated struts 169 are of tubular construction. A source of air pressure is supplied through the base bar 162 and struts 169 by means of the pipe connection 176 with the base bar and strut providing a common source of air distribution for the several table elements 168. This novel arrangement provides a cushion of air adjacent the support surface of the table to reduce the impact of the first strip as it is received on the table. As each succeeding glass strip is received upon the first or initial strip and upon one another, its fall is braked by the cushion of air which forms or exists between each strip and the preceding.

A backing plate 180 is provided on and in cooperation with the upper surface of the table to receive the leading edge of each strip 13 as it comes to rest on a preceding piled strip and to thereby align the strips in stacked relation with at least one edge located in a common plane. This backing plate is formed by an angular member 181 having a felt covering layer 182 on the vertical leg. The angular member includes spaced blocks 183 formed with a downwardly directed strap 184 which fits about approximate tubular element 168. By means of screws 185, threaded through nuts 186 fixed on the straps, the backing plate can be easily moved to any adjusted position on the table surface which is determined by the width of the strips 13 and the selected area of placement on the conveyor rolls 160.

A second edge of each of the individual strips 13 is aligned with the stack of strips 14 as the strips fall freely toward the stacking table 155. For this purpose a shifting means including a cylinder 188 mounted on the superstructure 132 by bracket 189 has a rubber-surfaced striker pad 190 carried by the piston rod 191. As the strip 13 moves between the rolls 150 and 151, the switching device 157, which is responsive to the leading edge of the strip causes operation of the cylinder 188, and as each glass strip falls freely toward the table, the cylinder moves the striker pad 190 against the adjacent edge of the strip to urge the same laterally into positive engagement with a stop means 193, also equipped with a rubber-surfaced pad 194.

Figure 19:
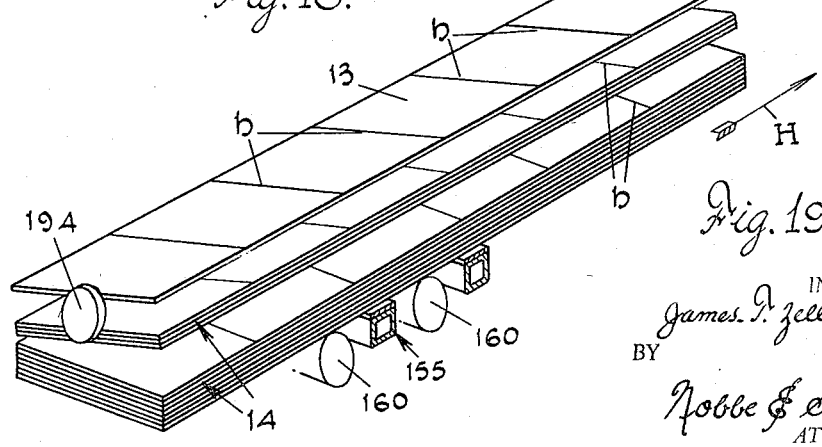

As can be seen in FIG. 19, the descending strip 13 is shown being engaged by the striker pad 190 so as to be moved laterally, as indicated by the arrow, designated by the letter r, until the opposite end encounters the locator pad 194. This arrangement serves to positively locate the ends or edges of the several strips, forming the pile 14, in vertical alignment with their score lines b in vertical superimposed relation with one another.

With particular reference to FIG. 6, it will be noted that the cylinder 188 and striker pad 190 are located only slightly above the plane of the stacking table when the table is in the inclined position. However, when the table is swung downwardly, the fixed position of the cylinder and striker pad permits the stack of strips to move freely therebeneath, for a purpose to be described hereinafter.

When a desired number of strips 13 resulting from the transverse scoring and breaking of a sheet 10 have been piled in stack relation on the support table, the action of the timing device 622 associated with the switch device 146 causes the table 155 to be lowered until the lowermost strip of the stack is deposited on the conveyor rolls 160. The raising and lowering of the table 155 is performed by an integral, downwardly directed arm 197 attached to the base bar 163 of the table, which in turn is connected by a clevis 198 to the piston rod 199 of a cylinder 200. This movement, as earlier explained, is activated by the timing device 622 (FIG. 23) which will be permitted to function after engagement of the switching device 146 by the last strip of each scored sheet, to thereby operate the cylinder 200 and lower the table 155 below the conveyor rolls 160.

Referring briefly to the conveyor carried by the framework 167 which is part of the second conveying means, the several rolls 160 (FIGS. 9 and 10) thereof are each supported in bearings 201 mounted on the side members 202 of the framework 167 and are also equipped at one end with a sprocket 203 to continuously drive said rolls in common with a power source, as at 204, through a chain drive 205. For reasons to be more fully explained, the rolls 160 are driven to advance a stack 14 of glass strips from the vicinity of the stacking table 155 to a position on a series of idler rolls 206 (FIGS. 11–13) which are also part of the second conveying means and are supported on the frame side members 202 by bearings 207.

The stop means 193, briefly referred to above, performs a second function of initiating the movement of the stack 14 along a second path as it is received on the conveyor rolls 160. To this end, as can be seen in FIGS. 9 and 10, the stop means 193 comprises a carriage 210 that is adjustably mounted on the angle member 181 of backing plate 180 by means of hand screws 211. The carriage supports a cylinder 212 by a bar 213 while the locator pad 194 is carried by the pressure rod 214 of the cylinder. The application of pressure to the head end of cylinder 212 is controlled to occur substantially at the same instant that the stack of strips is deposited on the conveyor rolls 160 and the pad 194 is thereby caused to move sharply against the vertically aligned ends of the strips to produce unison of motion as the stack is moved forwardly along the second path and further ensure that the score lines b are accurately in superimposed relation to one another.

During forward movement of the stack along the second predetermined path on the conveyor rolls 160 and before the rear end is removed from the last driven conveyor roll 160' (FIG. 11), the leading end of the stack engages the lever arm 215 of a switch device 216 that is mounted by bracket 217 on a superstructure generally designated by the numeral 218. As will be more fully explained hereinafter, switch device 216 is instrumental in producing continued movement of a stack along the second path toward the second breaking area J.

The superstructure 218, as illustrated in FIGS. 11 to 14, includes longitudinally spaced pairs of vertically disposed channels or pedestals 219 and 220 carried by the side members 202 of framework 167. These pedestals are intercnonected at their upper ends by transverse bracing members 221 and 222, respectively. The bracing members 221 and 222 support transversely disposed vertical frame members, generally designated by the numerals 223 and 224.

Each of the frame members 223 and 224 includes similarly arranged, spaced pairs of vertical channels 226–227 and 228–229 that are secured at their upper ends to a mutual cross member 230 structurally supported on the respective bracing members 221 and 222 by bolt connections 231, as in FIG. 13. The frame members 223 and 224 are interjoined by a longitudinal extending member 232 formed of two structural angles. As viewed in FIG. 11 as well as FIG. 13, the structural angles are secured to the respective cross members by bolt connections 233.

A pair of chain support tracks 235 are located at the lower ends of the channels 226–227 and 228–229 to support one or the active flight of a pair of sprocket chains 236 and 237 by means of rollers 238 conventionally associated with said chains. Each of these tracks 235 is formed by angle members 239 and 240 that are so arranged as to provide a substantially closed passage to be traversed by the rollers 238. Tracks 241, on the other hand, are formed of single angle members located above the tracks 235 to support the so-called "return" flights of the chain belts. The rollers 238 of the well-known ball-bearing type are supported in the usual way by a block 242 secured to conventional flange links of the chain belts.

Figure 11:
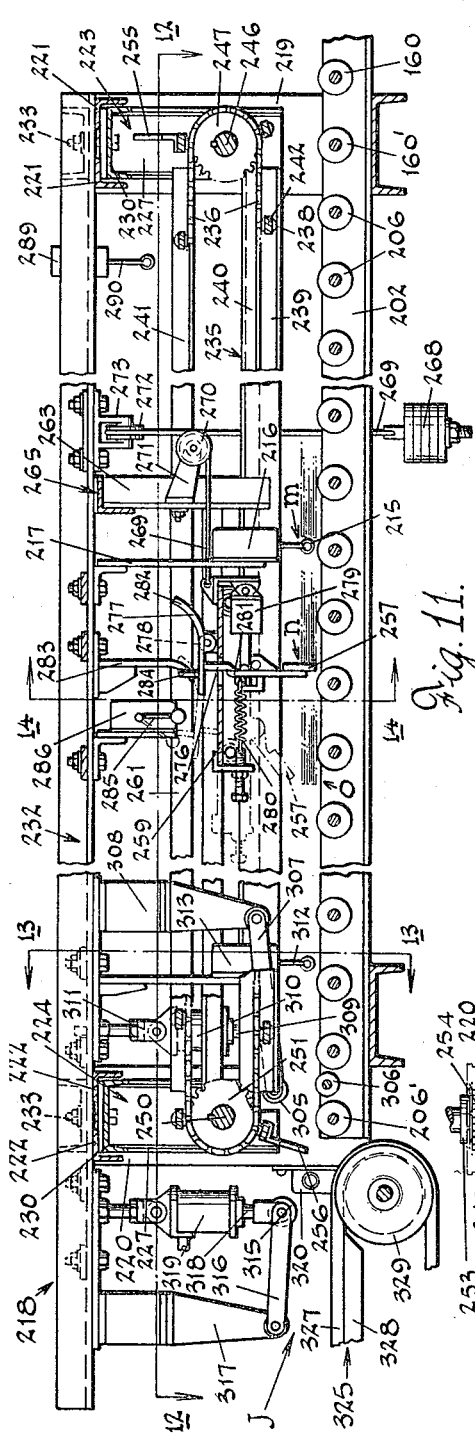
FIG. 11 is a longitudinal, vertical section taken on line 11—11 of FIG. 2.
Figure 12:
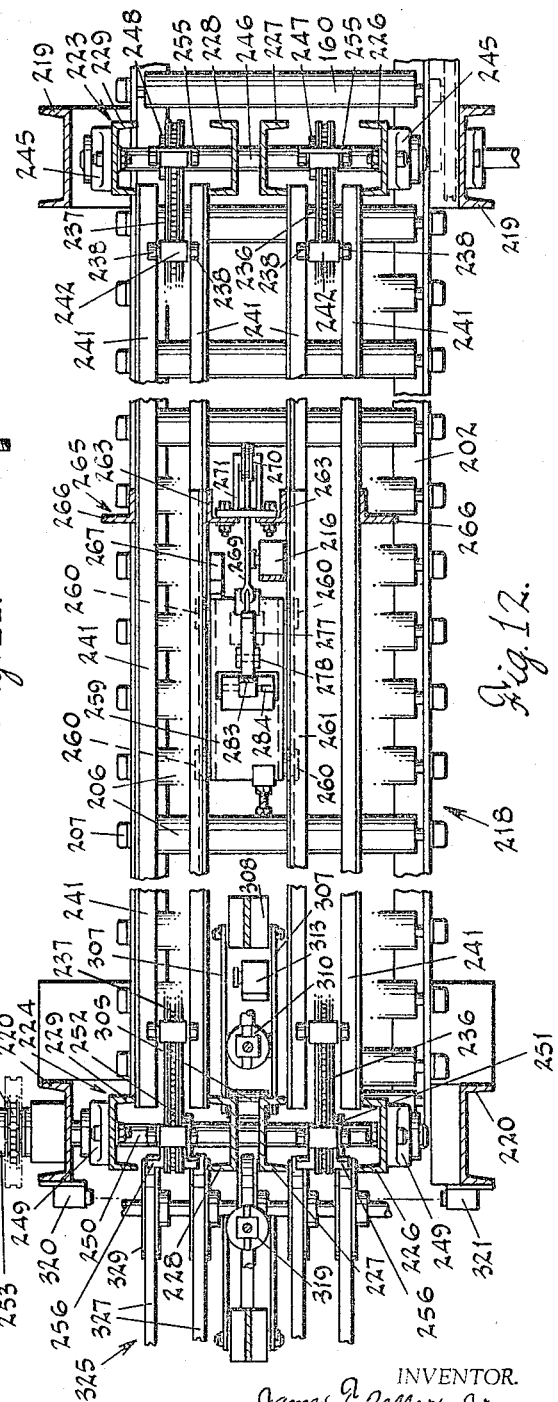
FIG. 12 is a horizontal section taken on line 12—12 of FIG. 11.

With reference to FIGS. 11 and 12, the channels 226 and 229 of frame member 223 mount bearings 245 on their outer surfaces for the support of a shaft 246. Sprockets 247 and 248 are keyed on this shaft in equally spaced relation between channels 226–227 and 228–229. With regard to frame member 224, the associated channels 226 and 229 by bearings 249 provide the support for a shaft 250 equipped with sprockets 251 and 252. In this instance, the shaft 250 projects outwardly beyond the adjacent pedestal channel 220 and is equipped with a sprocket 253 associated with a transmission unit 243 through chain belt 254. The sprockets 247 and 251 thus support the entrained ends of chain belt 236 while sprockets 248 and 252 similarly support the chain belt 237, with sprockets 251 and 252, being driven by a source of power, such as a motor 244, operatively associated with transmission unit 243.

Certain of the blocks 242 on chain belts 236 and 237 support sets of pusher plates 255 and 256 that are adapted to move a stack of strips forwardly along the second path on rolls 206 into the second breaking area J wherein the individual stacks 15 are produced. When the switch device 216 is actuated by the leading end of a stack of sheets, as shown by the broken line m in FIG. 11, the source of power 244 causes the belts 236 and 237 to carry one set of pusher plates 255 or 256, in sequential order, into engagement with the rear end of the stack to continue its forward movement. This also operates to temporarily bring the leading end of the stack into contact with a leading edge engaging means 257, as shown by the broken line n. The leading edge engaging means or "squaring" bar is located in the second path and is supported for movement so as to be used forward for a short distance by the stack. This movement is resisted, however, by a weighted force such that a degree of pressure is exerted at the leading ends of the strips to force the same stackwise against the pusher plates 255 or 256 thereby serving to vertically align the ends of the stack and ensure that the score lines b will be accurately superimposed one above the other. The cooperative action of the pusher plates and the "squaring" bar is further illustrated in FIG. 20.

"Squaring" bar 257, upon reference to FIGS. 11, 12 and 14, is pivotally supported on a cart 259 equipped along its opposite sides with grooved wheels 260 adapted to traverse a path defined by the angle components 240 of the tracks 235 and keeper rails 261. These rails at their respective ends are secured to the channels 227–228 of frame member 224 and the vertical elements 263 of a medially disposed frame member 265 attached to the longitudinal member 232 and by outwardly disposed vertical posts 266 connected at their lower ends to the outermost track members 239.

The cart 259, at the rest position of FIGS. 11 and 12, is urged against a stop 267 by a weighted member 268 connected to the cart through cable 269. The cable is trained about a sheave 270, supported by bracket 271 on the vertical frame elements 263; upwardly and about sheave 272 in bracket 273 on the cross member 232 and over and downwardly, about a sheave 274 in bracket 275, to its connection to the weight 268.

The "squaring" bar 257 is pivotally supported between the side walls of the cart 259 and is normally "latched" in its operative position by a depending leg 276 of a cam lever 277 pivotally mounted by bracket 278 on the upper surface of the cart. As herein provided, the bar 257 is influenced to swing from the full line operative position of FIG. 11 to an indicated broken line position during energization of a solenoid device 279 and to then be returned to the full line position by a coil spring 280 attached at its opposite end to the cart. When acted upon by the spring, the upper end 281 of the bar snaps under the adjacent end of the leg 276 to become "latched" thereagainst.

The actual distance that the bar 257 and cart 259 are carried forward by action of the moving stack of strips is determined by the operation of the cam lever 277. As viewed in FIG. 11, when the cart is urged forwardly, the upwardly rising end 282 of the lever engages a bar 283 having a mounting base secured to the member 232. Pivotal motion of the lever, as induced by the bar, permits the leg 276 to release the upper end 281 of the "squaring" bar. As the bar 257 is thus released, it is swung to the inactive position, as in broken line of FIG. 11, where it is maintained by the solenoid device 279 against the bias of spring 280. This action is responsive to the forward movement of the stack along the second path and is produced by a finger 284 on lever 277 which engages the lever arm 285 of a switch device 286 carried by the member 232 and which is instrumental in activating a timing device designated 287 in FIG. 23. The timer is activated by the switch in advance of release of the bar 257 by lever leg 276 to initially energize the solenoid device and monitor a time interval during which the bar is swung out of engagement with the stack, as at the broken line position o of FIG. 11, and cart 259 is moved rearwardly by the weight 268 while the rear end of the stack has been moved out of the area of the bar. At this time, the timer "times" out and the "squaring" bar is returned to the full line position by the spring 280, as will be further explained.

As herein provided and shown in FIG. 11, one set of pusher plates, such as the plates 255, while they are carried along the upper inactive flights of the chain belts traversing the tracks 241 toward the frame member 223 is instrumental in causing disengagement of the transmission unit 243 to halt the chain belts with said pusher plates in the vicinity of sprockets 247 and 248. This is achieved by actuation of the switch device 289 by arm 290. At the same time, the set of pusher plates 256 will have been carried along the tracks 235 by the lower active flight of the chain belts to move the immediate stack of glass strips through the second breaking area J and will be halted in the vicinity of the sprockets 251 and 252. In this respect it will be recalled that operation of the switch device 216 produces operation of the chain belts 236 and 237 by transmission 243 while switch device 289 causes the halting thereof.

As herein provided by way of example, the glass sheet 10, by reason of the transverse spaced, parallel score lines a, is divided into a plurality of seven strips 13. Due to the second scoring, the sheet is further divided by longitudinally spaced parallel lines b so that when the strips are successively formed by breaking of the sheet, each strip is still sub-divided into areas of equal width, six such areas being illustratively shown.

As explained hereinabove, as the strips 13 are formed in stack relation on the support or stacking table 155, the action of the pad 190 serves to laterally shift each strip against the stop means 193 and thus locate the score lines b in one strip in substantially exact vertically superimposed relation to like score lines in others of the strips. Also, when the stack 14 of strips is lowered onto and moved forwardly along the second path by the second conveyor means, the strips are adapted to be further aligned by the thrust action of the stop means 193, the pusher plates 255 or 256 and the "squaring" bar 257, before passing through the second breaking area J in which the stack will be acted upon to simultaneously break each superimposed area along the related score lines b. This action, occurring downwardly through the stack of strips, serves to accurately and rapidly break a plurality of stacked smaller panes therefrom into individual stacks 15 without manual intervention.

To this end, clamping means is provided to apply a downwardly directed stabilizing pressure on the stack while a second downwardly moving force instigates the breaking action. As shown in the illustrated embodiment, the clamping means is in the form of a roller 305 and a support roll 306; the roller 305 being carried by an arm 307 that is swingably mounted on a bracket 308 carried by the angles of the longitudinal member 232. The arm is adapted to be swung downwardly and upwardly by the action of a piston rod 309 associated with a cylinder 310 supported by a bracket 311, also on member 232. A valve 685 (FIG. 23) for the cylinder is actuated in response to engagement of arm 312 of a switch device 313 that is also mounted on the member 232 so that the arm 312 will be engaged by the advancing leading end of the stack of strips as the stack is being moved along the second path. Since the switch device 313 will be held closed while the arm 312 is in riding contact with the upper surface of the stack, it is intended that pressure directed to the cylinder will cause the stack to be clamped between the roller 305 and support roll 306 to prevent shifting of the stack as it is carried forwardly along the second path on the rolls 206 by either of the sets of pusher plates 255 or 256 into the second breaking area.

The stack of strips 14 is broken into a plurality of stacks of smaller panes 15 by the action of a second breaking means disposed along the second path in the breaking area J. The second breaking means includes a breaker roller 315 mounted on an arm 316, as shown in FIG. 11, which is pivotally mounted on a support member 317 that is secured to the frame member 232. The arm and roller are caused to intermittently move downwardly into engagement with the upper surface of the stack by the action of a piston rod 318 located within a cylinder 319 mounted on the frame structure 232 and connected to a control source of pressure, as shown in FIG. 23.

The operation of the piston rod 318 is controlled by means of a photocell 320 and a light source 321 producing a beam received by the photocell. As the leading edge of the stack advances past the last of the idler rolls 206, the light beam is interrupted which causes operation of the cylinder 319 to move the breaker roll 315 downwardly. The spaced relation of the roller 305 and the roller 315 is determined to produce a breaking action adjacent the first score lines b when the score lines are positioned substantially above the endmost roll 206'. The breaking of a stack 14 into stacks 15 of smaller panes is further diagrammatically shown in FIG. 21.

Each of the individual stacks 15 of smaller panes are received on a third conveyor means or take-off conveyor 325 that is mounted on a frame 326. As shown in FIGS. 2, 5 and 11, the conveyor 325 is adapted to move the stacks of panes along a third path disposed below the second path and includes a plurality of endless conveyor belts 327 supported on platform 328 with the opposite looped ends thereof being trained about pulley or grooved rolls 329 and 330 supported by bearings on the frame 326 and driven by a source of power 331. Preferably the belts 327 are operated at a slightly accelerated rate of speed with respect to the movement of the stacks 14 to rapidly advance each indivdual stack of smaller panes 15 as it is broken from the remaining length of strips. The individual stacks 15 may then be manually removed from the conveyor belts 327 and can be immediately placed in a carton for shipping or storage purposes.

Figure 22:
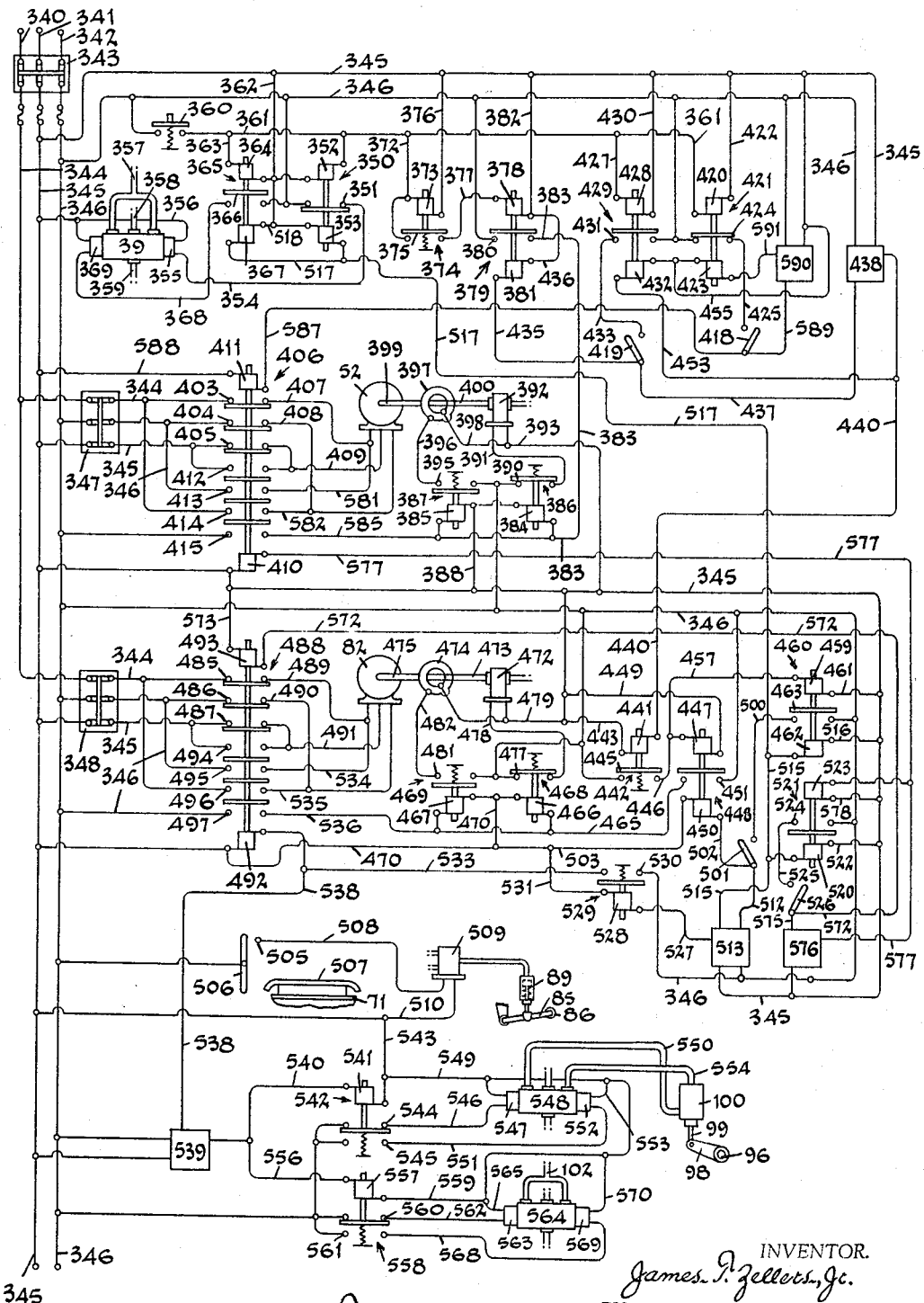
FIG. 22 is a diagrammatic view of a control system for the apparatus.
Figure 23:
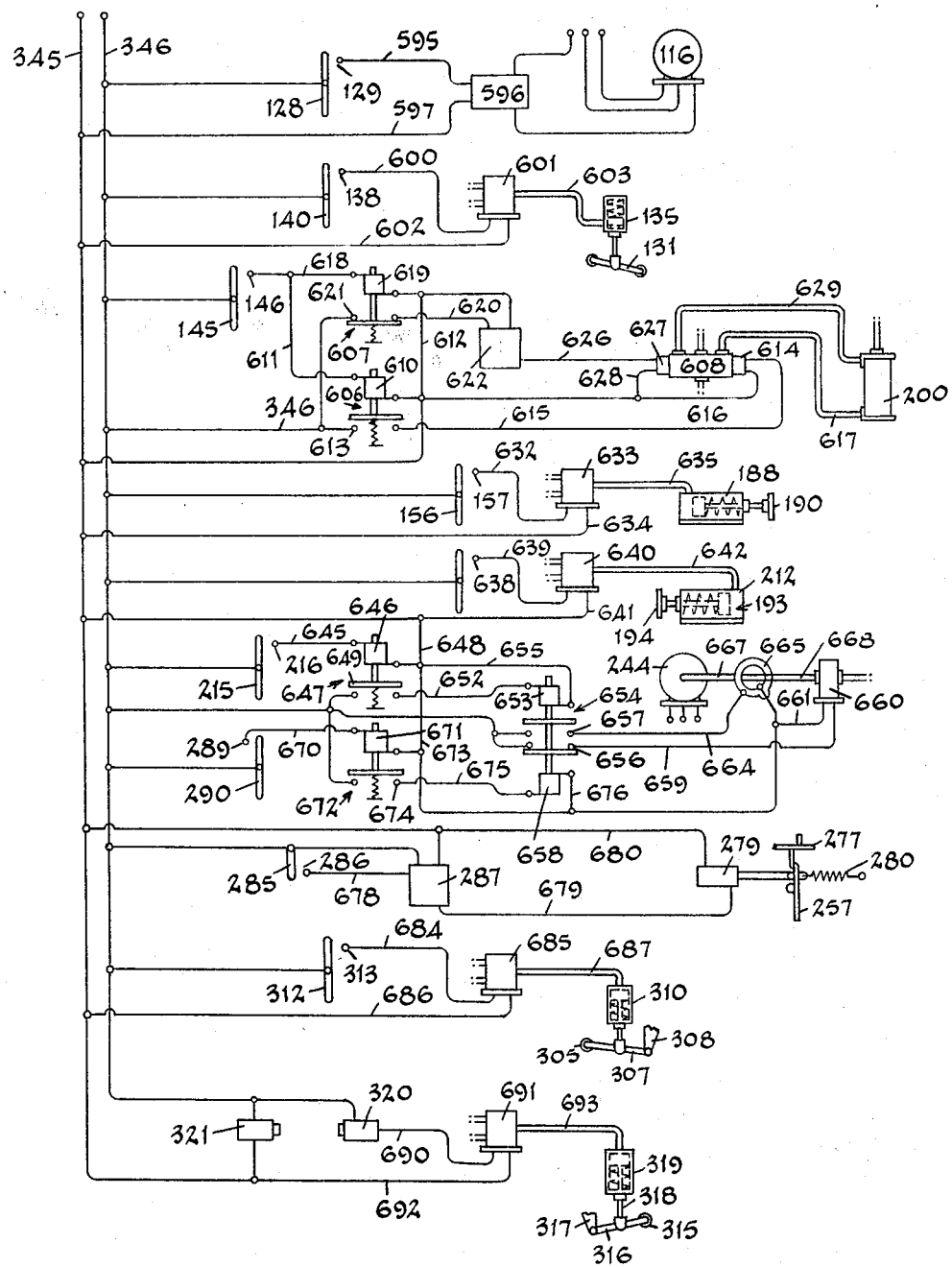
FIG. 23 is a further diagrammatic view of the control system.

In considering one cycle of the operation of the apparatus 18 by which the method of this invention can be automatically carried out on a practical basis, reference is made to FIGS. 22 and 23, wherein one exemplary electrical system for operation of the apparatus is disclosed.

Generally stated, a plurality of sources of electric energy are indicated at 340, 341 and 342, such source lines being connected through a control switch 343 and conventional fuses to supply lines 344, 345 and 346. Lines 344, 345 and 346 are connected to manual switches 347 and 348 associated with switch controls for the motors 52 and 82, respectively. Likewise, the supply lines 345 and 346 are adapted to be employed in connection with the previously mentioned switch devices.

While placing a glass sheet 10 on the surface of the worktable 19 and shifting the same into registration with the locator devices 42 and 43, the operator of the apparatus is aided by the previously described provision of low pressure air through the valve 39 to produce a cushion of air on which the sheet is supported and easily positioned on the table surface. The provision of air is controlled by a relay switch 350 having contacts 351 and opposed solenoids 352–353. The solenoid 353 is normally energized connecting contacts 351 to maintain a circuit from supply line 346, contacts 351 and line 354 through the end of 355 of valve 39 and thence by line 356 to supply line 345. The valve 39 is thereby adapted to deliver air under pressure from a source of supply through inlet 358 to the plenum chamber 36 by way of piping 357.

When operation of the apparatus is to be initiated, a normally open manual switch 360 is engaged to complete a circuit from supply line 346 by line 361 through solenoid 352 of relay switch 350 and line 362 to supply line 345 thereby opening the circuit of line 354 through the end 355 of valve 39 at contacts 351. Simultaneously, line 361 via line 363 completes a circuit through solenoid 364 of a relay switch 365 and line 362 to supply line 345; said switch having presently disengaged contacts 366 and opposed solenoid 367. Actuation of solenoid 364 engages contacts 366 to establish a circuit from line 346 and 368 through opposite end 369 of valve 39 and to supply line 345 by line 356; this controls said valve to connect a source of vacuum through pipe 359 to the plenum chamber 36 by piping 357 to firmly adhere the glass sheet to the felt surface of table 19.

During closure of switch 360, line 361 also connects by line 372 through solenoid 373 of spring-biased relay switch 374 and one side of the normally open contacts 375 thereof. The circuit through solenoid 373 is completed by line 376 to supply line 345 while a circuit through the presently closed contacts 375 and line 377 is completed through solenoid 378 of relay switch 379, having normally open contacts 380 and opposed solenoid 381, and line 382 to supply line 345. Contacts 380 complete a circuit from supply line 346, line 383 through solenoids 384 and 385 of spring-biased relay switches 386 and 387, respectively, and thence by line 388 to supply line 345. The contacts 390 of switch 386 in the normally closed position complete a circuit from supply line 346 by line 391 through electromagnetic brake 392 and line 393 to supply line 345. The circuit of line 383, however, energizes solenoid 384 thereby disengaging contacts 390 to de-energize said brake. Simultaneously, solenoid 385 of relay switch 387 produces engagement of contacts 395 to complete a circuit from supply line 346 and line 396 through electromagnetic clutch 397 to supply line 345 by lines 398 and 393. Clutch 397 couples the driving shaft 399 of motor 52 to driven shaft 400 of transmission 53 to operate screw shaft 50 and thereby propel the table 19 and glass sheet 10 forwardly through the first scoring area B.

In the original condition, motor 52 is connected to supply lines 344, 345 and 346 through control switch 347 and the engaged contacts 403, 404 and 405 of double-action relay switch 406 by lines 407, 408 and 409. This condition is maintained by the solenoid 411 of switch 406 which is adapted to be energized by a circuit through closed contacts 424, line 425, closed switch 418 and line 587. Switch 406 is also equipped with opposed solenoid 410 and disengaged contacts 412, 413, 414 and 415; one side of contacts 412 being connected to line 345, contacts 413 to line 346, contacts 414 to line 344 and contacts 415 to line 346.

Originally limit switch 418 is held closed by table 19 at the loading station and completion of line 361 establishes a circuit through solenoid 420 of double-action relay switch 421 to supply line 345 by line 422. When so energized, the solenoid 420 disengages aforementioned contacts 424 to break the circuit from line 346 through said contacts and line 425 to limit switch 418.

The completion of a circuit through line 361 is also established through solenoid 428 of double-action relay switch 429 by lines 427 and 430. Energizing solenoid 428 engages contacts 431 to complete a circuit from line 346 by line 433 to one side of presently open limit switch 419. When the table reaches its predetermined position within the second scoring area C, it produces closure of the switch 419. This completes a circuit from line 346 to line 435 and through solenoid 381 of relay switch 379 and lines 436 and 382 to supply line 345. In consequence, contacts 380 are disengaged to break the circuit by lines 346 and 383 to solenoids 384 and 385 of relay switches 386 and 387, respectively. The biasing springs of these relays cause disengagement of clutch 397 to disconnect shafts 399 and 400 and also energize brake 392 to halt rotation of shaft 400 coupled to transmission 53.

While completing line 435 to solenoid 381, limit switch 419 by branch line 437 also completes an activating circuit to a timing relay 438, connected to supply lines 345 and 346. This relay is adjusted to monitor an interval of time between positive stopping of the table 19 after scoring of the sheet 10 by the cutter units 56 and to then initiate movement of the bridge frame 61 whereby the cutter units 60 thereon will produce the plurality of score lines b. Thus, when relay 438 "times" out, it completes a circuit from supply line 346 and line 440 through solenoid 441 of a spring-biased relay switch 442 and by line 443 to supply line 345. Contacts 445 thereby establish a circuit from supply line 346 and line 446 through solenoid 447 of double-action relay switch 448 and line 449 to supply line 345; switch 448 having opposed normally energized solenoid 450 and normal disengaged contacts 451.

An auxiliary line 453 from line 440 completes a circuit through solenoid 432 of relay switch 429 to line 455 and supply line 345. Solenoid 432 is adapted to disengage contacts 431 to open the circuit of line 433 to limit switch 419. This is due to the fact that while the table 19 remains stationary within the second scoring area C, switch 419 will be maintained closed which would undesirably maintain the control circuits therethrough.

With further reference to switch contacts 445, line 446 also completes a circuit by branch line 457 through solenoid 459 of a double-action relay switch 460 to line 461 and supply line 345; switch 460 having opposed solenoid 462 and normally open contacts 463.

In the first instance, presently engaged contacts 451 of relay switch 448 complete a circuit from supply line 346 and line 465 through solenoids 466 and 467 of spring-biased relay switches 468 and 469, respectively, and line 470 to supply line 345. These relays are associated with an electromagnetic brake 472 controlling rotation of a driven shaft 473 to transmission 81 and an electromagnetic clutch 474 coupling the driven shaft to driving shaft 475 of motor 82. Thus, the energizing of solenoid 466 is effective to disengage related contacts 477 thereby breaking the circuit from supply line 346 and line 478 through the brake 472 and line 479 to supply line 345 thereby releasing shaft 473. On the other hand, solenoid 467 is adapted to engage related contacts 481 to establish a circuit from supply line 346 by line 482 through clutch 474 and line 479 to supply line 345 thereby operatively connecting motor 82 to transmission 81 to produce active movement of the bridge frame 61.

In the original condition, the motor 82 is connected to supply lines 344, 345 and 346 through control switch 348 and engaged contacts 485, 486 and 487 of a double-action relay switch 488 by lines 489, 490 and 491. This circuit is maintained by normally energized solenoid 493. Switch 488 is also equipped with opposed solenoid 492 and disengaged contacts 494, 495, 496 and 497; one side of contacts 494 being connected to line 345, contacts 495 to line 346, contacts 496 to line 344 and contacts 497 to line 346. During engagement of clutch 474, the transmission 81 is made operable to drive the screwshaft 80 and thereby propel the bridge frame 61 to carry the cutter units 60 forwardly across the sheet 10. As aforementioned, cutters 60 traverse the sheet, they form the plurality of parallel score lines b intersecting the score lines a thus dividing the sheet 10 into a plurality of rectangular areas of substantially equal dimensions.

Returning now to relay switch 460, the engaged contacts 463 thereof have established a circuit from supply line 346 and line 500 to one side of presently open limit switch 501. This switch is mounted on the frame structure 71 in position to be engaged by a portion of the bridge frame 61 upon completion of the second scoring operation. Consequently, closure of switch 501 is effective to halt further movement of said frame by the transmission 81. To this end, switch 501 completes a circuit by line 500 and line 502 through solenoid 450 of relay switch 448 and line 503 to supply line 345 via line 470. The resulting disengagement of contacts 451 breaks the circuit through solenoids 466 and 467 and permits the biasing springs to engage contacts 477 of switch 468 and disengage contacts 481 of switch 469. The brake 472 thus becomes effective to halt rotation of shaft 473 while de-energizing of clutch 474 uncouples shaft 473 from motor driving shaft 475.

Now, as the bridge frame 61 approaches the rightward limit of its movement, as in FIG. 6, the cylinder 89 (FIG. 7) is activated to lower the strike bar 85 so that the roller 86 will be put in contact with the remaining surface area of the sheet to be scored by the cutters 60. This action is shown in FIG. 15 wherein the bar 85 is moved downward from the broken line to the full line position. To this end, a one-way action switch device 505 is carried on the bridge frame 61 and is equipped with an arm 506 adapted to be actuated by a cam bar 507 which is fixedly mounted as on the frame structure 71. The mounted position of the bar and the effective length thereof are, of course, determined by the interval at which the switch 505 is to be operated and length of time that it is intended for a circuit to be completed therethrough. Thus, when moved to the closed position, the switch 505 completes a circuit from supply line 346 and line 508 through a valve 509 and line 510 to supply line 345; the valve connecting the head end of the cylinder 89 to a source of pressure to move the roller 86 downward by the strike bar 85. Upon separation of the arm 506 from the bar 507, the action of the cylinder is reversed by a conventionally contained spring to raise the strike bar and roller to their inactive position.

With further references to and during closure of limit switch 501, a circuit by line 512 is completed to a timing relay 513 in circuit with supply line 345 and 346. This relay operates to initially discontinue the circuit of line 500 to switch 501; to reverse the vacuum and air control valve 39; and to energize the solenoid 492 of relay switch 488. For these purposes, a circuit by line 515 is made through solenoid 462 of relay switch 460 to supply line 345 by line 516 thereby disengaging contacts 463. The circuit of line 515 is also completed by branch line 517 to establish circuits through the solenoids 353 and 367 of relay switches 350 and 365, respectively, and line 518 to supply line 345. Energization of solenoid 353 operates to engage contacts 351 to re-establish the circuit by line 354 through the side 355 of valve 39 and simultaneously solenoid 367 causes disengagement of contacts 366 and opening of line 368 through side 369 of the valve. Air is thus again directed through the plenum chamber 36 to the surface of table 19 to not only relieve the vacuous contact of the glass sheet but to provide a cushion of air on which the sheet will be supported as it is removed from the table onto the conveyor belts 108.

Line 515 from timing relay 513 also completes a circuit through solenoid 520 of double-action relay switch 521 and line 522 to supply line 345; said switch having opposed solenoid 523 and normally open contacts 524. The energized solenoid 520 engages contacts 524 to establish a circuit from supply line 346 by line 525 to one side of limit switch 526 located at the opposite end of frame structure 71.

Timing relay 513 by line 527 is also in circuit through the solenoid 528 of spring-biased relay switch 529, having normally open contacts 530, to line 531 to supply line 345 via line 470. Energized solenoid 528 engages contacts 530 to complete a circuit from supply line 346 by line 533 through solenoid 492 of relay switch 488 to supply line 345. This operates to reverse the polarity of motor 82 by disengagement of contacts 485, 486 and 487 and following engagement of contacts 494, 495 and 496. Thus, contacts 494 re-establish the circuit from supply line 345 to line 491; contacts 495 making circuit from supply line 346 by line 534 to motor circuit line 489 while contacts 496 connect supply line 344 by line 535 to motor circuit line 490. With the motor 82 thereby being reversally operated, the contacts 497 complete a circuit from supply line 346 and line 536 through the solenoids 466 and 467 of relay switches 468 and 469. As previously described, the activity of these switches releases the brake 472 and engages the clutch 474 to couple shaft 475 to shaft 473. In the present instance, reversal of motor 82 drives the screw-shaft 76, through transmission 81, to return the bridge frame to its rest position and in so doing cause the sheet 10 to be removed from the surface of table 14 by the pusher devices or vacuum cups 94. Limit switch 526 is eventually engaged to complete the circuit of line 525 therethrough to halt operation of the bridge frame, as will hereinafter be explained.

As previously described, the sheet pushing devices 92, are adapted to be lowered into engagement with the sheet 10 and, by vacuum cups 94, engage the sheet whereby returning movement of the bridge frame 61 will remove the sheet onto the conveyor belts 108. When sheet 10 has been moved sufficiently to be actively carried forward by the conveyor belts, the vacuum is relieved and the cups 94 are raised. In the original condition, a circuit is normally maintained from supply line 346 through contacts 544 of spring-biased relay switch 542 and lines 546 and 549 through the end 547 of valve 548 which operates to connect the rod end of the cylinder 100 to a source of air under pressure through pipe 550. A second circuit is maintained through the end 563 of valve 564 by normally engaged contacts 560 of relay switch 558 and lines 562 and 565 to supply low-pressure air, if desired, through the pipe 102 to vacuum cups 94.

When the rotation of the motor 82 is reversed by relay switch 529, as explained hereinabove, the timing device 539 is activated through line 538. This timer is adjusted to monitor the desired interval of time that the pushing devices 92 are lowered and the cups 94 thereof connected to a source of vacuum. Thus, the activation of timing device 539 establishes a circuit by line 540 through the solenoid 541 of relay switch 542 to open the circuit through contacts 544 and establish a circuit through contacts 545 and by line 551 through the end 552 of valve 548 and line 553 to supply line 345. This action operates to connect the head end of cylinder 100 to a source of air pressure via pipe 554 thereby causing piston rod 99 to rotate shaft 96, through lever 98, and swing the arm 95 to lower the vacuum cups 94 into engagement with the surface of sheet 10. The timing device 539 simultaneously establishes a circuit through solenoid 557 of relay switch 558 through lines 556 and 559 which opens the circuit through contacts 560 and establishes a circuit through contacts 561 and lines 568 and 570 to end 569 of valve 564. This action reverses the position of the valve 564 to supply a source of vacuum to cups 94 through pipe 102.

When timer 539 completes its function, the circuits of lines 540 and 556 are opened and switches 542 and 558 caused by spring action to disengage contacts 545 and 561, respectively, and re-engage contacts 544 and 560. In the first instance, contacts 544 will again effect functioning of valve 548 to cause the same to again direct air pressure to the rod end of cylinder 100 to raise the arms 95 while the contacts 560 will similarly restore the circuit of line 562 whereby valve 564 will again connect pipe 102 to a source of low pressure air which at the vacuum cups 94 will be effective to readily break their vacuous engagement with the glass sheet.

When the bridge frame 61 reaches the limit of its return movement, leftward in FIGURE 6, it engages the limit switch 526 which connects the lines 525 and 572 and completes the circuit through the solenoid 493 of relay switch 488 by line 573 to supply line 345. This action causes contacts 494, 495, 496 and 497 to be disengaged and contacts 485, 486 and 487 re-engaged. The disengagement of contacts 497 results in opening of the line circuit 536 to solenoids 466 and 467 which opens the circuit of line 482 through contacts 481 of relay switch 469 to disengage clutch 474 and closure of line 478 at contacts 477 to engage the driven shaft 473 by energized brake 472.

The closing of limit switch 526 also completes a circuit through line 575 to timing relay 576, connected to supply lines 345 and 346, which is adjusted to monitor an interval of short duration while the bridge frame is halted and then complete a circuit from supply line 346 by line 577, through solenoid 523 of relay switch 521 to line 578 and supply line 345 to open the circuit of line 525 at contacts 524. This renders limit switch 526 inoperable until the frame 61 is moved from engagement during a subsequently occurring second scoring operation.

The line 577 also completes through the solenoid 410 of relay switch 406 to supply line 345. This action disengages contacts 403, 404 and 405 to open the line circuits therethrough to motor 52 and reverses polarity of the motor upon engagement of contacts 412, 413 and 414 to complete a line circuit from supply line 345 to line 409, a circuit from line 346 by line 581 to motor circuit line 407 and a circuit from line 344 by line 582 to motor circuit line 408. Contacts 415 of relay switch 406 substantially simultaneously complete a circuit from supply line 346 by line 585 through solenoids 384 and 385 of relay switches 386 and 387, respectively, to release the brake 392 and engage clutch 397. This results in coupling of the motor shaft 399 to driven shaft 400 and transmission 53 to reversely operate the screw shaft 50 and move the table 19 rearwardly to the loading position.

When the limit switch 418 is engaged at the loading position, it will complete the circuit of line 425 from supply line 346, through contacts 424 which were initially engaged during temporary closure of manual switch 360 and completion of line 361. Switch 418 is thereby adapted to establish a circuit by line 587 through the solenoid 411 of relay switch 406 to line 588 and supply line 345 to especially produce disengagement of contacts 415 thereby opening the circuit of line 346 to line 585. This acts to de-energize solenoids 384 and 395 of relay switches 386 and 387, respectively, to produce disengagement of the clutch 397 and halting of the shaft 400 by the brake 392. Contacts 412, 413 and 414 are likewise disengaged while the original circuits to motor 52 are restored upon engagement of contacts 403, 404 and 405.

The closing of limit switch 418 also completes a circuit by line 589 to activate a timing relay 590 connected to supply lines 345 and 346. This timing relay monitors a period of time during which the motion of the table is halted and the circuits controlled by the switch 418 have carried out the intended phase of the automatic operation and thereafter completes a circuit by lines 591 and 455 through solenoid 423. The contacts 424 of relay 421 are thus opened to break the circuit of supply lines 346 to line 425 and switch 418. The control circuits for the operation of the table 19 and bridge frame 61 are thus in a position for a subsequently initiated scoring operation.

When the sheet 10 has been carried a suitable, pre-determined distance by the conveyor belts 108, the arm 128 of switch device 129 is engaged by the sheet's leading edge to actuate said switch as the roll of said arm traverses the sheet surface. Switch 129 completes a circuit from supply line 346 by 595 through a speed controlling element 596 and line 597 to supply line 345. The control element 596 is conventionally employed in cooperation with the motor 116 (FIG. 2) to reduce the operating speed of the same while the sheet is being broken into a plurality of strips along score lines $a$. When arm 128 drops from the trailing end of the sheet, opening of the switch device 129 permits the motor 116 to resume its normal rate of operational speed.

Figure 17:
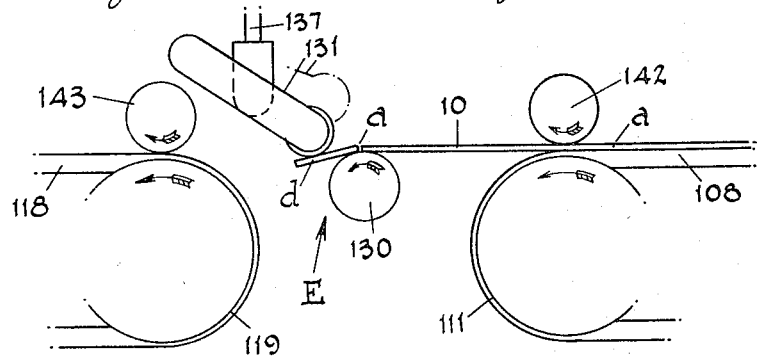

As the sheet is carried into the first breaking area E, its leading end passes between the conveyor rolls 111 and the hold-down roll 142. The said end or selvage edge $d$ is then engaged by the roll of lever arm 131 and while passing over the breaker roll 130, is broken from the major portion of the sheet, as shown in FIG. 17. As the leading end of the sheet approaches the lever arm 131, it also engages the arm 140 of switch device 138. The closing of the switch 138 completes a circuit from supply line 346 by line 600 through a valve 601 and line 602 to supply line 345. The valve 601 connects the rod end of cylinder 135 to a source of pressure through pipe 603 to raise the lever arm 131 against the counteraction of a spring conventionally contained within the cylinder and acting upon the opposite side of the piston therein. Accordingly, after the selvage edge $d$ has been removed, the switch arm 130 will be engaged by the newly created leading end of the sheet and the valve will be maintained active to raise the lever arm 131 and to support it above the surface of the sheet until the arm 140 drops from the trailing end of the sheet. Upon opening of switch device 138, the valve is closed to the source of pressure whereupon the arm 131 will be lowered to its active position.

As the sheet continues forwardly, the new leading end passes over the breaker roll 130 and beneath the second hold-down roll 143 resulting severance along the second score line $a$ to produce the first strip 13. In sequence, the sheet is progressively broken along successive score lines $a$.

While advancing on the "run-out" conveyor belts 118, each strip 13 engages the arm 145 of switch 146. This switch controls the upward and downward swinging motions of the stacking table 155 by the actuation of a pair of spring-biased relay switches 606 and 607 which produce operation of a valve 608 associated with the cylinder 200.

Originally the table 155 is in a lowered position and, upon temporary closure fo the switch 146, a circuit is completed through solenoid 610 of relay switch 606 via lines 611 and 612 to engage contacts 613 to complete a circuit to one end 614 of valve 608 through lines 615 and 616. This action will operate the valve to supply air pressure to the head end of the cylinder 200 through pipe 617 to swing the stacking table upwardly into the inclined or angular position in which the glass strips are received. Temporary closure of the switch 146 also completes a circuit by line 618 through the solenoid 619 of relay switch 607 to open the circuit of line 620 through contacts 621 to the timer 622 which normally monitors a pre-determined period of time after which the table will be swung downwardly. This time interval is cancelled upon opening of the circuit of line 620. And, since the application of pressure through pipe 617 is maintained to the cylinder 200, the table 155 will remain in the inclined position.

However, each time the switch 146 is engaged by a strip 13, the above action of switches 606 and 607 will occur and the rapidity with which the strips from one sheet successively engage the arm 145 of switch device 146 ensures that the timing function of relay 622 will not be realized until the last one of a total, such as of seven strips, has produced repetitive acuation of the relay switches 606 and 607. Now, when the last strip has disengaged the arm 145, the circuit of lines 611 and 618 will be broken to solenoids 610 and 619 of relay switches 606 and 607, respectively. The resulting closure of contacts 621 and restablishment of line circuit 620 will reactivate the timing device 622 for its intended purpose. When the device "times" out, a circuit from supply line 346 is completed by line 626 through the end 627 of valve 608 and line 628 to supply line 345. The valve is thereupon actuated to direct pressure through pipe 629 to the rod end of cylinder 200 with resultant lowering of the stacking table 155 and removal of the stack 14 of strips onto the conveyor rolls 160. Of course, when the first strip of a subsequently scored sheet trips the switch device 146, the same will be operable to raise the table by operation of valve 608 through relay switch 606.

As each strip 13 successively moves forward beyond the pinch rolls 150 and 151, it engages the arm 156 of switch device 157 to establish a circuit from supply line 346 by line 632 through a valve 633 and line 634 to supply line 345. This valve is connected by pipe 635 to the head end of cylinder 188 which causes the pad 190 to be momentarily urged against the end edge of the strip, as indicated by the arrow designated by the letter $r$, in FIG. 19, to move the same endwise with the opposite end edge being forced into engagement with the pad 194 of stop means 193 associated with cylinder 212 on the carriage 210. This results in the like ends of the several strips being accurately aligned in a vertical plane. Upon opening of the switch 157, a conventionally spring-actuated control for cylinder 188 causes the same to retract the pad 190.

As aforementioned, the carriage 210 and cylinder 212 are mounted on the stacking table 155 and move therewith. Also, it was stated that as a stack 14 is received on the conveyor rolls 160, pressure is directed to the cylinder 212 to urge the pad 194 of stop means 193 against the end of the stack to ensure that the total of strips will initially be moved forward in unison. For this purpose, a switch device 638 is mounted on the conveyor framework 167 so as to be engaged when the table 155 is moved to the lowered position. This establishes a circuit from supply line 346 by line 639 through a valve 640 and line 641 to supply line 345. As in the case of valve 633, valve 640 momentarily directs pressure through pipe 642 to the head end of cylinder 212 whereupon pad 194 of stop means 193 is thrust against the end of the stack and then retracted.

As previously described, the stack 14 is removed endwise along a second path by the rolls 160 from the area of the stacking table 155, while it is in the lowered position, and onto the idler rolls 206. As the rear end of the stack approaches the last driven roll 160' (FIG. 11), the leading end engages the arm 215 of switch device 216 to initiate operation of the motor 244 to drive the chain belts 236 and 237. This causes a pair of pusher plates, either pair 255 or pair 256, to be carried into active engagement with the rear end of the stack and to continue its movement forwardly along the second path into engagement with the squaring bar 257. As illustrated in FIG. 20, initial impact of the leading edges of the strips against the vertical surface of the squaring bar produces a momentary forcing of the strips against the pusher plates. Accurate registration of the score lines $b$ is thus ensured while the squaring bar 257 is moved forward against the resistance of the weighted member 268. As previously described, the bar 257 is thereafter swung upwardly so that the stack of strips will pass therebeneath.

To this end, switch device 216 completes a circuit from supply line 346 by line 645 through solenoid 646 of a spring-biased relay switch 647 and line 648 to supply line 345; said relay having normally open contacts 649. While solenoid 646 is energized, contacts 649 are adapted to establish a circuit from supply line 346 by line 652 through the solenoid 653 of double-action relay switch 654 and line 655 to supply line 345. Relay 654 has normally closed contacts 656, normally open contacts 657 and opposed solenoid 658. Contacts 656 normally maintain a circuit from supply line 346 by line 659 through magnetic brake 660 and line 661 to supply line 345. While solenoid 653 of relay switch 654 is energized, contacts 656 are disengaged while contacts 657 are engaged to make a circuit by lines 346 and 664 through electronegative clutch 665 which operates to join driven shaft 667 of motor 244 and driven shaft 668 of transmission 243.

In the event that the pusher plates 256, by way of example, are engaged with the stack to move the same forwardly along the second toward and through the second breaking area J, the pair of plates 255 are carried rearwardly along the tracks 241, and, adjacent the sprockets 247 and 248, engage the arm 290 of switch device 289. The device is adjustably mounted on the bracing member 232 to terminate operation of transmission 243 substantially at the same time that the rear or last stack of small panes 15 have been urged onto the conveyor belts 327. Switch device 289 thus will make a circuit from supply line 346 by line 670 through solenoid 671 of spring-biased relay switch 672 and line 673 to supply line 345 thereby closing the normally open contacts 674. These contacts will then establish a circuit from supply line 346 by line 675 through solenoid 658 of relay switch 654 and line 676 to supply line 345; this resulting in opening of contacts 657 and closing of contacts 656 to de-energize clutch 665 and re-activate brake 660.

While the stack is engaged by a pair of pusher plates at its rear end, the leading end is brought into contact with the squaring bar 257, and initial resistance of the weight 268 produces a desired degree of pressure on the ends of the strips to ensure that the ends will be aligned and, more particularly, the superimposed score lines *b* will register with one another. Due to the driving impetus of motor 244, the chain belts 236 and 237 urge the then actively employed pusher plates, 255 or 256, forwardly to overcome the effort of weight 268 to carry the bar 257 and the cart 259 forward the pre-determined distance.

As hereinabove described, the forward movement of the cart 259 moves the finger 284 of lever 277 into engagement switch lever 285 in advance of release of the squaring bar 257 by the lever 277. This permits the switch device 286 to thus complete a circuit from supply line 346 by line 678 to the timer device 287 which is connected to supply lines 345 and 346. The timer functions, during its active interval, to complete a circuit by line 679 through solenoid 279 and line 680 to supply line 345. Consequently, when the end 282 of lever 277 engages the bar 283 and acts to disengage the leg 276 from the end 281 of the squaring bar 257, the solenoid is instantly operative to swing the squaring bar to its inactive position as indicated in broken line in FIG. 20. Also, after the desired interval of time for the stack to pass beneath the squaring bar, the timing device ceases to function, the solenoid 279 is de-energized and the spring 280 will return the bar 257 to its latched and operative position.

When a stack of glass strips approaches the exit end of the conveyor rolls 206 and enters the second breaking area J, the leading end thereof engages the arm 312 of switch device 313. This completes a circuit from source line 346 by line 684 through the valve 685 to line 686 and supply line 345. The valve 685 thereby directs pressure through pipe 687 to the head end of cylinder 310 to produce downward motion of the lever 307 to clamp the stack between rolls 305 and 306 and stabilize the stack on the conveyor roll 206'. As shown in FIG. 21, the lever 307 moves from the upper broken line position to the active position shown in full line to maintain the roller 305 firmly on the upper surface of the stack.

As the leading end of the stack moves past the roll 206', it interrupts the light beam received by the photocell 320 which completes a circuit to valve 691 through lines 690 and 692. The valve 691 supplies air pressure by pipe 693 to the cylinder 319 moving the roller 315 downward into striking contact with the stack of strips to break the same along the first group of score lines *b* into a stack of smaller panes.

The individual stack of smaller panes is moved out of the breaking area J at an accelerated rate to allow the light beam from source 321 to again be received by the photocell 320, opening the circuit to valve 691 and causing the roller 315 to be raised by the action of the spring associated with the cylinder.

When the newly created leading edge of the stack of strips moves past the idler roller 206' it again interrupts the light beam and the above action is repeated breaking the stack of strips along the second group of score lines and producing another stack of smaller panes 15 from the stack of strips 14.

The above action is repeated until the stack of strips 14 is broken into individual stacks of smaller panes 16, as clearly shown in FIG. 21. As the trailing edge of the stack of strips 14 moves past the lever arm 312 of switch 313, the spring-biased switch will return to the open position to allow the spring associated with cylinder 310 to raise the roll 305 and arm 307 to the broken line position shown in FIG. 21.

*Complete operation*

Briefly stated, according to the illustrative embodiment disclosed, a glass blank is divided into groups of smaller units in the following manner. As shown in FIG. 2, a glass blank 10 is placed on the table 19 with two adjacent edges engaging the locator devices 42 and 43 and with the operator being aided by the provision of low pressure air through the openings 37 of the table surface.

After the sheet has been properly located, an automatic sequence of operation is initiated by closing the manual switch 360 (FIG. 22). The closing of the normally open switch operates to reverse the position of the valve 39 connecting a source of vacuum to the plenum chamber 36 to firmly adhere the glass blank to the surface of the table 19. The switch also connects the motor 52 (FIG. 2) to the shaft 50 moving the table past the cutter 55 thereby producing the first group of score lines *a*.

As the table reaches a predetermined position 19' (FIG. 2), it closes the switch 419 (FIG. 22) which operates to disconnect the shaft 50 from the motor 52 to stop the table in the predetermined position. The closure of the switch also activates the timer 438 which monitors an interval of time between stopping of the table 19 and then operatively connects the motor 82 to the shaft 80 to produce active movement of the bridge frame 61 (FIG. 2) carrying cutters 60 across the blank 10 to produce the second group of score lines *b*.

As the bridge 61 approaches its rightward limit of movement, the switch 505 (FIG. 22) is engaged by a cam bar 507 fixedly mounted on the frame structure 71 to connect a source of pressure to the cylinder 89 moving the roller 86 into engagement with the glass surface. As the roller moves over the unsupported selvage edge *c* (FIGS. 15 and 16), the edge is broken and removed along the score line *a* by downward thrust of the striker bar 85.

Upon completion of the second scoring operation, the bridge frame 61 closes a normally open switch 501 which activates a time delay relay that initially disconnects the shaft 80 from the motor 82 to stop the bridge frame and reverses the valve 39 to again supply air pressure to the table surface 34. After a predetermined time delay, the polarity of the motor 82 is reversed through appropriate circuitry and is again connected to the shaft 80 to move the bridge 61 to its original position shown in FIG. 2. At the time of reversal of polarity of the motor, the timing device 539 is activated to lower the pushing devices 92 into engagement with the blank surface and connect the cups 94 to a source of vacuum for a predetermined period of time. This operates to move the blank from the table 19 and onto the conveyor belts 108. At the end of the predetermined time period, the timer operates to connect a source of air pressure to the cups 94 and raise the pushing device 92 to allow the blank to be carried along the first predetermined path by the conveyor belts 108. When the bridge frame 61 reaches a position shown in FIG. 2, it engages a switch 526 to disconnect the motor 82 from the shaft 80 and halt the bridge frame.

As the scored blank is being moved by the conveyor belts 108 (FIGS. 2 and 6), the leading edge engages a switch 129 which operates to reduce the speed of the conveyor belts 108 during the first breaking operation. The leading or selvage edge $d$ of the blank is engaged by the roller on lever arm 131 and the selvage edge is removed (FIG. 17) and the arm is then raised by the switch 140 which is engaged by the newly created leading edge. The blank is thereafter broken into strips 13 by the co-action of the rolls 130, 142 and 143.

As the strips advance along the first path on the conveyor belts 118, the leading edges engage the arm 145 (FIG. 6) of switch 146 to raise the table 155 to an inclined position. The switch also operates a timer 622 which monitors an interval of time and then lowers the table to the horizontal position. As the leading edge of each strip passes between pinch rolls 150 and 151 (FIG. 6), it engages another switch 157 which sequentially operates a striker pad 190 to move each strip laterally into engagement with pad 194 of stop means 193 as it is received on the table 155 (FIG. 19). After the last strip is received on the table, the timer operates to lower the table to a horizontal position to load the stack of strips onto the conveyor rolls 160. The lowering of the table operates a switch 638 to move the pad 194 of stop means 193 (FIG. 9) sharply into engagement with one edge of the stack to produce unison of motion of the stack along a second predetermined path on the conveyor rolls 160.

As the stack is moved along the second path from the conveyor rolls onto the idler rolls 206 (FIG. 11), the leading edge thereof engages a switch 216 which starts the motor 244 to move one set of pusher plates 255 or 256 into engagement with the trailing edge of the stack to continue movement of the stack along the second path on the idler rolls 206 and into engagement with the leading edge engaging means or "squaring" bar 257. This operation ensures that the superimposed score lines $b$ are vertically aligned, as shown in FIG. 20. The "squaring" bar is urged forward for a short distance by the stack and then is raised to an inoperative position by the switch 286.

Continued movement of the stack along the second path by the pusher plates 255 or 256 causes the leading edge to engage the switch 313 (FIG. 11) which operates to lower the pivotally mounted arm 307 and clamp the stack between rollers 305 and 306. The continued movement along the second path thereafter causes the leading edge to interrupt a light beam from source 321 (FIG. 12) and directed across the path of movement which operates the cylinder 319 to lower the roller 315 into engagement with the upper surface of the stack. Therefore, as the first group of score lines passes over the idler roll 206', the stack is broken along those score lines to produce a stack 15 of smaller panes 16 which are received on the third conveyor means 325. This action is repeated until the stack is broken along each set of score lines $b$.

Although the illustrative embodiment of the novel stacking and breaking apparatus has been disclosed in combination a scoring and breaking apparatus, it is readily apparent that the novel apparatus can be used with various other apparatus. For example, a single conveyor having means for providing score lines in the sheet longitudinally of its path of movement can be substituted for the disclosed scoring and breaking apparatus. In this manner, individual sheets having one set of score lines could be stacked and broken by the novel apparatus to produce smaller-sized units.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim:

1. A method of separating glass sheets into a plurality of smaller units, comprising scoring a plurality of sheets along a plurality of spaced parallel lines, passing the scored sheets forwardly along a predetermined path parallel to the score lines and automatically stacking them one upon the other to form a stack, with said score lines in superimposed relation, and then breaking the stack group of sheets simultaneously along said score lines.

2. A method as defined in claim 1, wherein the scored sheets passing along said predetermined path are caused to fall freely upon a supporting surface and upon one another to form the stack.

3. A method as defined in claim 2, wherein the air displaced by successive sheets as they fall freely forms a cushion of air between subsequent sheets which serves to reduce the force of glass-to-glass impact as the sheets come to rest upon one another.

4. A method as defined in claim 3, including the step of creating a positive air cushion between the supporting surface and the first glass sheet.

5. A method as defined in claim 4, including initially stacking the sheets in an inclined position and subsequently moving said sheets to a horizontal position before being broken along said score lines.

6. A method as defined in claim 2, including the step of shifting each scored sheet in the direction of its length as it falls freely to line up one end edge of said sheet with the corresponding edges of the other sheets on the supporting surface and the said score lines in registry with one another.

7. A method as defined in claim 6, including the further step of exerting a forward pressure upon the rear previously aligned end edges of the stack of sheets to move them forwardly, and breaking the sheets in said stack simultaneously along said score lines during forward movement of the sheets.

8. A method as defined in claim 7, including engaging the forward edges of the stack of sheets as the stack moves forwardly but before the sheets are broken along said score lines to assure alignment of the front and rear edges of the sheets during breaking.

9. A method as defined in claim 8, including initially stacking the sheets in an inclined position upon an inclined supporting surface, and subsequently moving said supporting surface and sheets to a horizontal position before passing the said sheets forwardly to be broken.

10. A method as defined in claim 2, wherein the sheets upon continued forward movement along said predetermined path are passed between upper and lower rotating annular surfaces which grip the top and bottom faces of the sheet to move said sheet forwardly, and in which the axis of rotation of said annular surfaces are vertically displaced, with the axis of the lower annular surface being located forwardly of the axis of the upper annular surface, said annular surface coacting to support the sheet substantially horizontally until it is ejected from between said surfaces and caused to fall freely upon said supporting surface or upon a preceding sheet.

11. A method of separating glass sheets into a plurality of smaller units, comprising scoring a sheet along a plurality of spaced parallel lines extending in one direction, then scoring the sheet along a plurality of spaced parallel lines extending at right angles to the first score lines, breaking the sheet along said first score lines to produce a plurality of elongated strips, passing said strips along a predetermined path and automatically stacking them one upon the other to form a stack, with said second score lines in superimposed relation, and then breaking the stacked group of strips simultaneously along said second score lines.

12. A method as defined in claim 11, wherein after the sheet is broken along said first score lines, the resulting strips are carried forwardly through a support area, continuing forward movement of the strips beyond said support area where the first strip is caused to fall freely upon a supporting surface and successive strips are caused to fall freely upon the first strip and upon one another, the air displaced by successive strips as they fall freely forming a cushion of air between subsequent strips which serves to reduce the force of glass-to-glass impact as the strips come to rest upon the supporting surface and upon one another.

13. A method as defined in claim 12, including initially stacking the strips in an inclined position and subsequently moving the strips to a horizontal position before being broken along said second score lines, and creating a positive air cushion between the supporting surface and the first glass strip.

14. A method as defined in claim 12, including the steps of shifting each strip in the direction of its length as it falls freely to line-up one end edge of said strip with the corresponding edges of the other strips on the supporting surface, with said second score lines in registry with one another, exerting a forward pressure upon the rear previously aligned end edges of the stack of strips to move them forwardly, engaging the forward edges of the stack of strips as the stack moves forwardly to assure alignment of the front and rear edges of the strips, and then breaking the strips in said stack simultaneously along said second score lines during continued forward movement of the strips.

15. A method as defined in claim 14, wherein the strips are initially stacked in an inclined position upon an inclined supporting surface, and including the step of subsequently moving said supporting surface and strips to a horizontal position before passing the said strips forwardly to be broken.

16. A method as defined in claim 12, wherein the strips, upon continued forward movement beyond said support area, are passed between upper and lower rotating annular surfaces which grip the top and bottom faces of the strip to move said strip forwardly and in which the axes of rotation of said annular surfaces are vertically displaced, with the axis of the lower annular surface being located forwardly of the axis of the upper annular surface, said annular surfaces coacting to support the strip substantially horizontally until it is ejected from between said surfaces and caused to fall freely upon said supporting surface or upon a preceding strip.

17. Apparatus for separating glass sheets, comprising means for scoring said sheets along a plurality of spaced, substantially parallel lines, conveying means for moving successive sheets along a predetermined path, means adjacent the exit end of said conveying means for receiving and automatically stacking said sheets one upon the other, with said score lines in superimposed relation, and means for breaking the stacked group of sheets simultaneously along the superimposed score lines.

18. Apparatus for separating glass sheets as defined in claim 17, in which said stacking means includes gripping means adjacent the exit end of said conveying means for gripping and continuing forward movement of said sheets substantially horizontally until released by said gripping means whereupon said sheets are caused to fall freely upon one another to form said stack.

19. Apparatus for separating glass sheets as defined in claim 18, in which said gripping means includes upper and lower driven rolls extending transversely above and below said path, with the axis of said lower roll being located forwardly along said path than the axis of said upper roll, said rolls being spaced from each other and coacting to receive the successive sheets therebetween and to support them substantially horizontally until ejected from between said rolls and caused to fall freely upon one another to form said stack.

20. Apparatus for separating glass sheets as defined in claim 17, in which said stacking means includes support means for receiving successive sheets one upon the other to form the stack, said support means being disposed beneath said path to allow said sheets to fall freely thereupon as each sheet is moved along said path.

21. Apparatus for separating glass sheets as defined in claim 20, in which said support means includes a table for receiving the sheets thereon, and means for providing a cushion of air to reduce the force of impact as the first sheet is received on said table and in which the air displaced by successive sheets as they fall freely reduces the force of glass-to-glass impact as the sheets come to rest one upon the other.

22. Apparatus for separating glass sheets as defined in claim 20, in which said stacking means includes means for shifting each sheet transversely of said path as it falls freely to align corresponding edges of successive sheets upon said support means and thereby locate corresponding score lines in registry with one another.

23. Apparatus for separating glass sheets as defined in claim 22, including means responsive to the forward movement of each sheet along said path for operating said shifting means.

24. Apparatus for separating glass sheets as defined in claim 20, in which said support means is mounted in an inclined position to receive said sheets.

25. Apparatus for separating glass sheets as defined in claim 24, including means responsive to the forward movement of the last of a group of sheets to lower said support means from said inclined position to a horizontal position preparatory to breaking said stack.

26. Apparatus for separating glass sheets, comprising means for scoring the sheets along a plurality of spaced score lines, first conveying means for successively moving said sheets longitudinally of said score lines along a first path, means adjacent the exit end of said first conveying means for receiving and automatically stacking said sheets one upon the other, with said score lines in superimposed relation, second conveying means for moving said stack of sheets along a second path, and means disposed along said second path for breaking the sheets in said stack simultaneously along the superimposed score lines.

27. Apparatus for separating glass sheets as defined in claim 26, including means responsive to the forward movement of said stack of sheets along said second path to operate said breaking means to break said stack of sheets along successive groups of superimposed score lines.

28. Apparatus for separating glass sheets as defined in claim 26, including means adjacent said second path for engaging the upper surface of said stack of sheets to clamp said sheets as they are broken along said score lines.

29. Apparatus for separating glass sheets as defined in claim 28, including means responsive to the forward movement of said stack of sheets for moving said clamping means against said sheets.

30. Apparatus for separating glass sheets as defined in claim 26, including means for engaging the rear edge of said stack to move the sheets in said stack forwardly in unison along said second path.

31. Apparatus for separating glass sheets as defined in claim 30, including additional means located along said second path to engage the leading edge of said stack of sheets during forward movement thereof to ensure alignment of said superimposed score lines.

32. Apparatus for separating glass sheets as defined in claim 31, including means responsive to the forward movement of the stack of sheets to move said last-named engaging means out of the path of movement of said stack.

33. Apparatus for separating glass sheets as defined in claim 26, in which said stacking means includes support means mounted adjacent the exit end of said first conveying means and beneath said first path to receive said sheets from said first conveying means as they are moved along said first path, and means for mounting said support means for movement from a horizontal position beneath said second path to an inclined position above said second path to receive said sheets.

34. Apparatus for separating glass sheets as defined in claim 33, including means responsive to the forward movement of the first of a plurality of sheets along said first path to move said support means to said inclined position to receive a plurality of sheets in a stack, and responsive to the last of said plurality of sheets to lower said support means to said horizontal position for depositing said stack of sheets on said second conveying means.

35. Apparatus for separating glass sheets as defined in claim 26, in which said stacking means includes a support table located below said first path, gripping means along said first path for receiving said sheets from said first conveying means and for carrying them forwardly to a position above the support table, said sheets upon being released by said gripping means being caused to fall freely one upon another on said table, stop means mounted adjacent one end of said table, means responsive to the forward movement of the leading edge of each sheet to move said sheet transversely of said first path into engagement with said stop means to align the score lines of successive sheets in superimposed relation.

36. Apparatus for separating glass sheets as defined in claim 35, in which said table is disposed in an inclined position to receive said sheets, and including means responsive to the forward movement of the last of a plurality of sheets to move said table from said inclined position to a horizontal position below said second path for depositing the stack of sheets on said second conveying means, and means responsive to the movement of said table to horizontal position to move said stop means forwardly along said second path to urge the sheets in said stack forwardly in unison along said second path.

37. Apparatus for automatically separating glass sheets into a plurality of smaller units, including means for scoring said sheets along first and second groups of spaced parallel score lines extending perpendicular to each other, first breaking means adapted to break each sheet into individual strips along said first score lines, first conveying means for moving said scored sheets long a first path through said first breaking means, support means disposed below said first path adjacent the exit end of said first conveying means adapted to receive the individual strips one upon the other to form a stack, with said second score lines in superimposed relation, second conveying means adapted to receive and convey said stack of sheets along a second path, and second breaking means along said second path for breaking said stack of strips along said second score lines.

38. Apparatus for automatically separating glass sheets into a plurality of smaller units as defined in claim 37, in which said support means is mounted for movement from a horizontal position below said second path to an inclined position between said first and second paths to receive said strips in a stack, and including means responsive to the leading edge of the first strip of one sheet to raise said support means to said inclined position, and means responsive to the forward movement of the last strip from said sheet for lowering said support means to said horizontal position for depositing said stack on said second conveying means.

39. Apparatus for automatically separating glass sheets into a plurality of smaller units as defined in claim 37, including stop means mounted on said support means, gripping means disposed along said first path for receiving said strips from said first conveying means and for carrying them forwardly to a position above said support means, said strips upon being released by said gripping means being caused to fall freely upon one another on said support means, and means responsive to the movement of each strip during its free falling movement to shift the strip laterally of said first path to vertically align the superimposed second score lines on said strips.

40. Apparatus for automatically separating glass sheets into a plurality of smaller units as defined in claim 39, including means responsive to the forward movement of the last strip of each sheet to move said stop means forwardly along said second path to move said stack of strips forwardly in unison along said second path to said second breaking means.

41. Apparatus for automatically separating glass sheets into a plurality of smaller units as defined in claim 37, including means disposed along said second path for engaging the leading edge of said stack as it is moved forwardly along said second path to ensure vertical alignment of said superimposed second score lines, clamping means responsive to the forward movement of said stack along said second path for engaging said stack to prevent lateral shifting of the sheets, and means responsive to the continued forward movement of said stack for successively operating said breaking means to break said stack along successive groups of said second score lines into a plurality of groups of smaller units.

42. Apparatus for automatically separating glass sheets into a plurality of smaller units as defined in claim 41, including third conveying means for receiving and conveying said groups of smaller units along a third path.

No references cited.

WILLIAM W. DYER, Jr., *Primary Examiner.*

J. M. MEISTER, *Assistant Examiner.*